(12) United States Patent
Yamaguchi

(10) Patent No.: US 10,632,969 B2
(45) Date of Patent: Apr. 28, 2020

(54) VEHICLE CONTROL SYSTEM

(71) Applicant: DENSO CORPORATION, Kariya, Aichi-pref. (JP)

(72) Inventor: Taichi Yamaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/738,967

(22) PCT Filed: Jun. 2, 2016

(86) PCT No.: PCT/JP2016/002683
§ 371 (c)(1),
(2) Date: Dec. 21, 2017

(87) PCT Pub. No.: WO2017/017877
PCT Pub. Date: Feb. 2, 2017

(65) Prior Publication Data
US 2018/0178758 A1    Jun. 28, 2018

(30) Foreign Application Priority Data

Jul. 29, 2015 (JP) .................................. 2015-149327

(51) Int. Cl.
*B60R 25/24* (2013.01)
*H04Q 9/00* (2006.01)
(Continued)

(52) U.S. Cl.
CPC ............ *B60R 25/248* (2013.01); *B60R 25/24* (2013.01); *B60R 25/245* (2013.01); *E05B 49/00* (2013.01);
(Continued)

(58) Field of Classification Search
CPC ..... B60R 25/248; B60R 25/24; B60R 25/245; B60R 2325/10; H04M 1/00; H04M 11/00;
(Continued)

(56) References Cited

U.S. PATENT DOCUMENTS

| 2012/0154114 A1 | 6/2012 | Kawamura |
| 2015/0120085 A1* | 4/2015 | Sanji ....................... B60R 25/24 701/1 |
| 2016/0272154 A1 | 9/2016 | Sanji et al. |

FOREIGN PATENT DOCUMENTS

| DE | 102013223157 A1 * | 5/2015 | ............ G01S 13/88 |
| EP | 2465737 A2 | 6/2012 | |

(Continued)

OTHER PUBLICATIONS

DE102013223157A1—English translation, 2013 (Year: 2013).*

*Primary Examiner* — Abby Y Lin
*Assistant Examiner* — Renee LaRose
(74) *Attorney, Agent, or Firm* — Harness, Dickey & Pierce, P.L.C.

(57) ABSTRACT

A vehicle control system includes a vehicle-mounted device and a mobile device portable by a user. The vehicle-mounted device permits a predetermined operation on a vehicle based on a response signal transmitted from the mobile device in response to a request signal from the vehicle-mounted device. The vehicle-mounted device includes a first communication device performing a wireless communication with the mobile device under a predetermined communication protocol different from that of the request signal. The mobile device includes: a second communication device performing the wireless communication with the first communication device; and a response control unit that responds to the request signal under a condition that the mobile device is located in a communication range of the first communi- (Continued)

cation device and the wireless communication between the first communication device and the second communication device is established.

16 Claims, 11 Drawing Sheets

(51) Int. Cl.
      *H04M 1/00*       (2006.01)
      *H04M 11/00*     (2006.01)
      *E05B 49/00*      (2006.01)
      *G07C 9/00*       (2020.01)

(52) U.S. Cl.
     CPC ..... *G07C 9/00007* (2013.01); *G07C 9/00309* (2013.01); *H04M 1/00* (2013.01); *H04M 11/00* (2013.01); *H04Q 9/00* (2013.01); *B60R 2325/10* (2013.01); *G07C 2009/00547* (2013.01); *G07C 2009/00555* (2013.01); *G07C 2009/00793* (2013.01)

(58) Field of Classification Search
     CPC ...... H04Q 9/00; E05B 49/00; G07C 9/00007; G07C 9/00309; G07C 2009/00547; G07C 2009/00555; G07C 2009/00793
     See application file for complete search history.

(56) References Cited

FOREIGN PATENT DOCUMENTS

| | | |
|---|---|---|
| JP | 2012062651 A | 3/2012 |
| WO | WO-201504020 A1 | 1/2015 |

\* cited by examiner

VEHICLE CONTROL SYSTEM

CROSS REFERENCE TO RELATED APPLICATIONS

This application is a U.S. National Phase Application under 35 U.S.C. 371 of International Application No. PCT/JP2016/002683 filed on Jun. 2, 2016 and published in Japanese as WO 2017/017877 A1 on Feb. 2, 2017. This application is based on and claims the benefit of priority from Japanese Patent Application No. 2015-149327 filed on Jul. 29, 2015. The entire disclosures of all of the above applications are incorporated herein by reference.

TECHNICAL FIELD

The present disclosure relates to a vehicle control system that includes a vehicle-mounted device mounted on a vehicle and a mobile device portable by a user, and allows a predetermined operation of the vehicle-mounted device on the vehicle based on a response signal transmitted from the mobile device in response to a request signal from the vehicle-mounted device.

BACKGROUND ART

Up to now, a vehicle control system (also referred to as an electronic key system, a smart entry system, or a passive entry passive start (PEPS)) that permits a predetermined operation on a vehicle based on a bidirectional communication between a vehicle-mounted device that is mounted on a vehicle and a mobile device that can be carried by a user has been known (for example, refer to Patent Literature 1). In the vehicle control system, a request signal is transmitted from the vehicle-mounted device, for example, periodically or when the user performs an operation such as touching a door handle or depressing an engine start switch. An ID included in a response signal transmitted from the mobile device in response to the request signal is checked against a master ID. When verification is successful, locking and unlocking of vehicle doors and an engine start are permitted.

In the above-described vehicle control system, relay attack which is one kind of theft method has been known. The method is illustrated in FIG. 14. In this method, in a situation where an owner is away from the vehicle, criminals X and Y are located between the vehicle and the owner. It is assumed that the owner carries the mobile device. The criminals X and Y possess radio repeaters.

In this state, the criminals X and Y first relay the request signal transmitted from the vehicle to a location of the owner. Although a transmission range of the request signal is limited to a periphery of the vehicle, the request signal can reach the location of the owner by signal relay performed by the criminals X and Y. Upon receiving the request signal, the mobile device carried by the owner of the vehicle returns the response signal responsive to the request signal as an RF signal.

The returned RF signal reaches the vehicle. The vehicle carries out a verification process between the received RF signal and the master ID. Since the RF signal is a signal returned from the mobile device carried by the owner, the verification is naturally successful. As a result, the vehicle permits unlocking of the vehicle door. In this way, the criminal can enter the vehicle.

Further, when the same procedure is repeated after the criminal X has gotten on the vehicle, the vehicle interior verification is successful and the engine start of the vehicle is permitted. In this way, the criminal enables the vehicle to travel. The above process is an outline of relay attack.

Effective countermeasures against such a relay attack are obviously necessary. As disclosed in a technique disclosed in Patent Literature 1, it is known that a first WAKE signal among multiple WAKE signals for activating a mobile device (or activating a communication start) transmitted from a vehicle to the mobile device at the beginning of a communication cannot be relayed to the mobile device by a third party. In order to reduce a damage caused by the relay attack, a vehicle side device disclosed in Patent Literature determines whether a response signal to the WAKE signal is a first response signal to a first WAKE signal or a second or subsequent response signal to a second or subsequent WAKE signal. When the vehicle side device determines that there is no first response signal, a predetermined operation of the vehicle is not permitted.

PRIOR ART LITERATURE

Patent Literature

Patent Literature 1: JP 2012-62651A

SUMMARY OF INVENTION

According to a technique of Patent Literature 1, since a series of signals (multiple WAKE signals and the subsequent command signals) transmitted from the vehicle is transmitted with the same LF band radio wave, the first WAKE signal may be relayed to the mobile device in some cases. In this case, a damage caused by the relay attack may occur.

An object of the present disclosure is to provide a vehicle control system capable of effectively reducing a damage caused by a relay attack in view of the above circumstances.

According to a first aspect of the present disclosure, a vehicle control system includes a vehicle-mounted device mounted on a vehicle and a mobile device that is portable by a user. The vehicle-mounted device permits a predetermined operation on the vehicle based on a response signal which is transmitted from the mobile device in response to a request signal transmitted from the vehicle-mounted device. The vehicle-mounted device or a portable object of the user includes a first communication device that performs a wireless communication with the mobile device under a predetermined communication protocol different from a communication protocol of the request signal. The mobile device includes: a second communication device that performs the wireless communication with the first communication device under the predetermined communication protocol; and a response control unit that responds to the request signal under a condition that the mobile device is located in a communication range of the first communication device and the wireless communication between the first communication device and the second communication device is established under the predetermined communication protocol. The response control unit does not respond to the request signal when the mobile device is located outside of the communication range of the first communication device and the wireless communication between the first communication device and the second communication device is not established under the predetermined communication protocol.

According to a second aspect of the present disclosure, a vehicle control system includes a vehicle-mounted device mounted on a vehicle and a mobile device that is portable by a user. The vehicle-mounted device permits a predetermined operation on the vehicle based on a response signal which is transmitted from the mobile device in response to a request signal transmitted from the vehicle-mounted device. The vehicle-mounted device includes a first communication device that performs a wireless communication with the mobile device under a predetermined communication protocol different from a communication protocol of the request signal. The mobile device includes a second communication device that performs the wireless communication with the first communication device under the predetermined communication protocol. The vehicle-mounted device includes a transmission control unit that transmits the request signal under a condition that the mobile device is located in a communication range of the first communication device and the wireless communication between the first communication device and the second communication device is established under the predetermined communication protocol. The transmission control unit does not transmit the request signal when the mobile device is located outside of the communication range of the first communication device and the wireless communication between the first communication device and the second communication device is not established under the predetermined communication protocol.

According to a third aspect of the present disclosure, a vehicle control system includes a vehicle-mounted device mounted on a vehicle and a mobile device that is portable by a user. The vehicle-mounted device permits a predetermined operation on the vehicle based on a response signal which is transmitted from the mobile device in response to a request signal transmitted from the vehicle-mounted device. The vehicle-mounted device includes a first communication device that performs a wireless communication with the mobile device under a predetermined communication protocol different from a communication protocol of the request signal. The mobile device includes a second communication device that performs the wireless communication with the first communication device under the predetermined communication protocol. The vehicle-mounted device includes an operation control unit that permits the predetermined operation based on the response signal under a condition that the mobile device is located in a communication range of the first communication device and the wireless communication between the first communication device and the second communication device is established under the predetermined communication protocol. The operation control unit does not permit the predetermined operation when the mobile device is located outside of the communication range of the first communication device and the wireless communication between the first communication device and the second communication device is not established under the predetermined communication protocol even though the response signal is received.

According to the vehicle control system of the first, second and third aspects, the first communication device performs the wireless communication with the mobile device under a communication protocol different from that of the request signal. When the mobile device (second communication device) is located outside the communication range of the first communication device, that is, when the mobile device is located away from the vehicle or the user's portable object, the mobile device does not respond to the request signal, the vehicle-mounted device does not transmit the request signal, or the vehicle-mounted device does not permit the predetermined operation on the vehicle even though the response signal is received. As described above, as a condition for permitting the predetermined operation on the vehicle, the communication should be established between the first communication device and the second communication device under a communication protocol different from that of the request signal. With this configuration, the damage caused by the relay attack can be further reduced.

BRIEF DESCRIPTION OF DRAWINGS

The above and other objects, features and advantages of the present invention will become more apparent from the following detailed description made with reference to the accompanying drawings. In the drawings.

Figure 1:
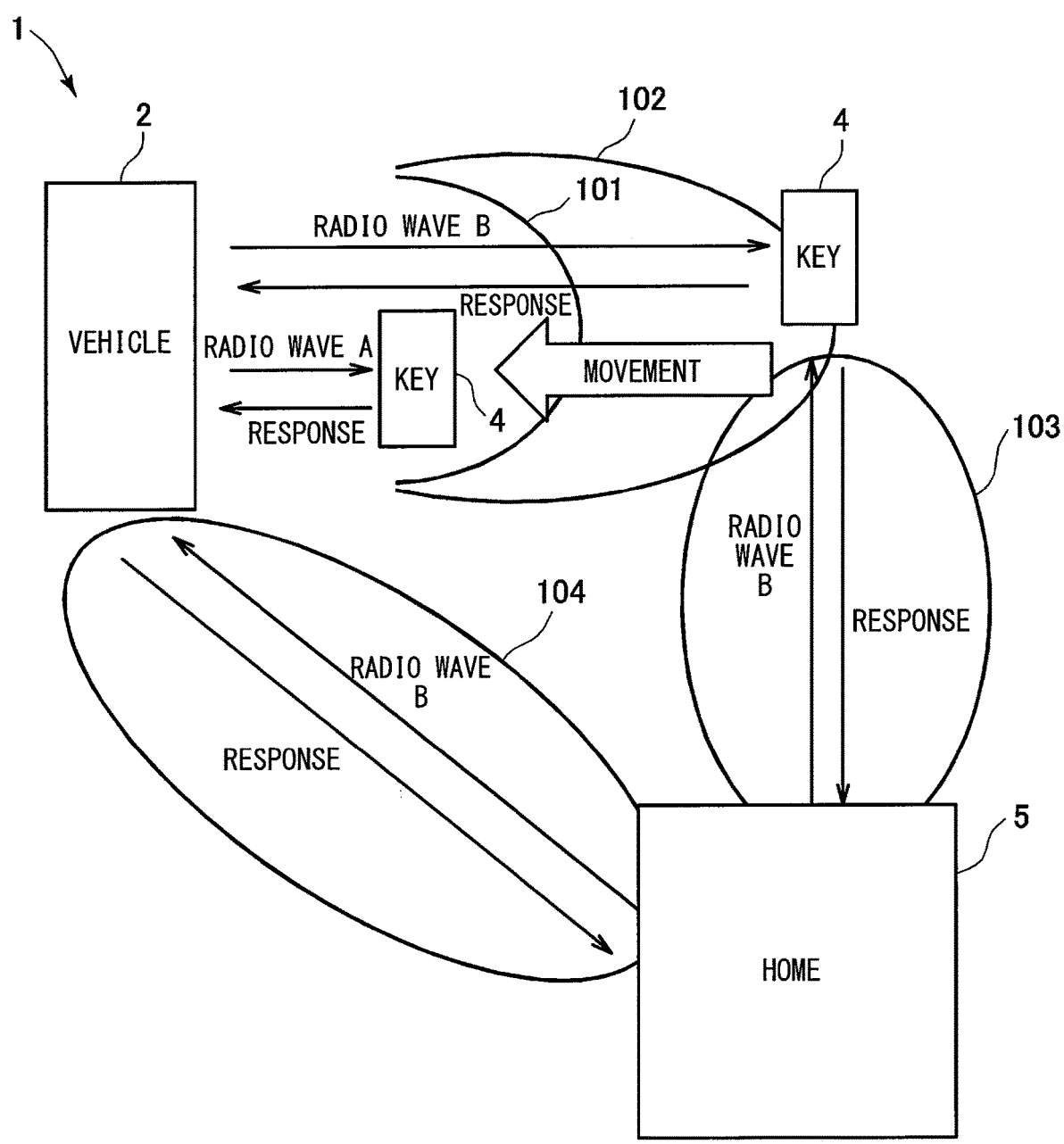
FIG. 1 is a diagram illustrating an outline of a vehicle control system.

EMBODIMENTS FOR CARRYING OUT INVENTION (First Embodiment)

Hereinafter, a first embodiment will be described with reference to the drawings. First, a configuration of a vehicle control system according to the present embodiment will be described. A vehicle control system 1 illustrated in FIG. 1 includes a vehicle-mounted device 3 (refer to FIG. 2) that is mounted on a vehicle 2, a key 4 corresponding to a mobile device that can be carried by a user of the vehicle 2, and a home device 6 (refer to FIG. 4) corresponding to an invalidation device that is installed at a user's home 5. The vehicle control system 1 is an electronic key system that permits a predetermined operation on the vehicle 2, more specifically, locking and unlocking of a vehicle door and engine starting, based on bidirectional communications between the vehicle-mounted device 3 and the key 4. Further, the vehicle control system 1 (electronic key system) also supports RKE (remote keyless entry) for locking and unlocking the vehicle door based on unidirectional communication from the key 4 to the vehicle-mounted device 3. Hereinafter, configurations of the respective devices 3, 4, and 6 will be described.

Figure 2:
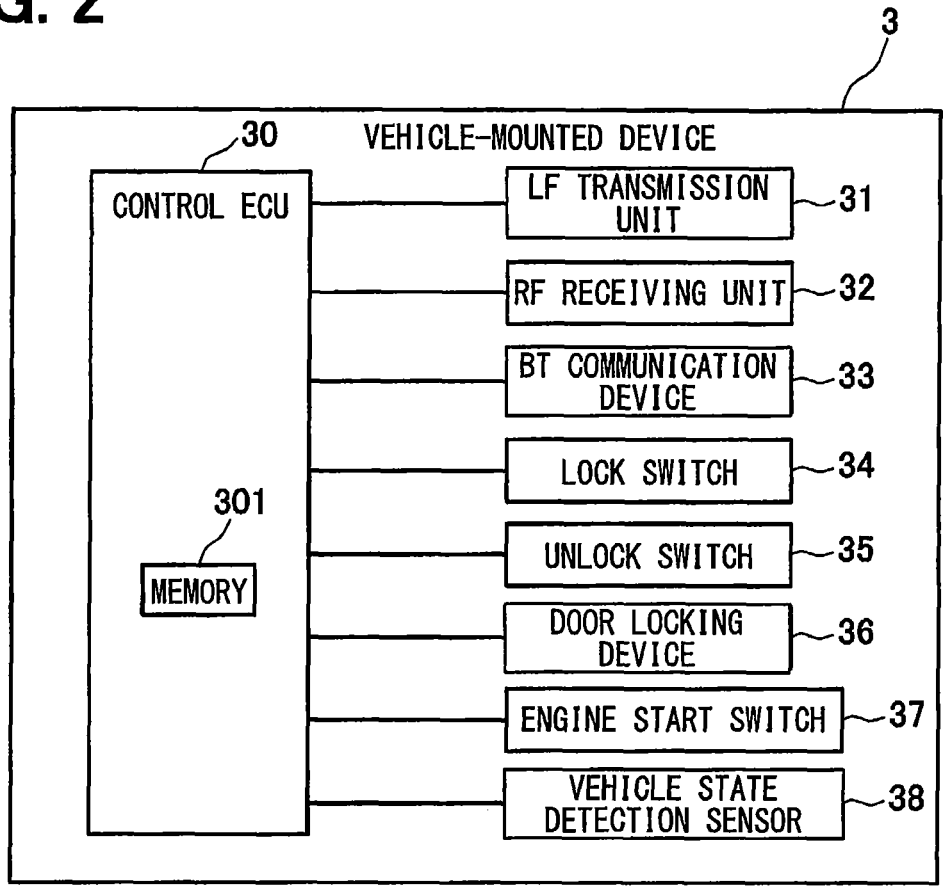
FIG. 2 is a configuration diagram of a vehicle-mounted device.

As shown in FIG. 2, the vehicle-mounted device 3 includes an LF transmission unit 31, an RF receiving unit 32, a BT communication device 33, a lock switch 34, an unlock switch 35, a door locking device 36, an engine start switch 37, a vehicle state detection sensor 38, and a control ECU 30 (ECU: Electronic Control Unit) to which these components are connected.

The LF transmission unit 31 includes multiple sub units disposed in multiple places in the vehicle, and each sub unit transmits a request signal for requesting a reply toward a corresponding communication range of the own sub unit using radio waves of LF band (for example, 125 kHz) (hereinafter referred to as radio wave A). The request signal is a signal for searching and authenticating the key 4. The LF transmission unit 31 transmits the request signal, for example, using a radio wave in ASK modulation (ASK: amplitude shift keying). The sub units of the LF transmission unit 31 include vehicle exterior transmission units each of which transmits the request signal to a periphery of the vehicle 2 outside the vehicle, and a vehicle interior transmission unit that transmits a request signal into the vehicle interior. The vehicle exterior transmission units are installed, for example, on a right side surface, a left side surface and a rear surface of the vehicle. A transmission range 101 (refer to FIG. 1) of the request signal of each vehicle exterior transmission unit is set, for example, in a range of about 1 meter to 2 meters from the vehicle 2.

The RF receiving unit 32 receives a response signal transmitted using a radio wave of an RF band (radio wave of 300 to 400 MHz, for example) from the key 4.

The BT communication device 33 wirelessly communicates with surrounding wireless communication devices (the key 4 and the home device 6 in the present embodiment) having communication function of Bluetooth (registered trademark) according to the communication system of Bluetooth (registered trademark). A communication range 102 (refer to FIG. 1) of the BT communication device 33 is set to an area wider than the transmission range 101 (refer to FIG. 1) of the request signal (for example, an area of several tens of meters from the vehicle 2). The communication range 102 also includes the inside of the vehicle. In order to perform a wireless communication using Bluetooth (registered trademark), there is a need to pair both of the communication devices that perform a communication with each other. In the present embodiment, it is assumed that the vehicle-mounted device 3 (the BT communication device 33) is paired with the key 4 (BT communication device 43 (refer to FIG. 3)), the vehicle-mounted device 3 is paired with the home device 6 (BT communication device 62 (refer to FIG. 4)), and the key 4 is paired with the home device 6 in advance. The communication protocol of Bluetooth (registered trademark) is different from both of a communication protocol (communication system of an LF signal) of the LF transmission unit 31 and a communication protocol (communication system of an RF signal) of the RF receiving unit 32. The BT communication device 33 corresponds to a first communication device and a detection unit (vehicle receiving unit).

The lock switch 34 is a switch (for example, push switch) that is provided, for example, in the vicinity of a door handle provided on the vehicle exterior side of each door of the vehicle 2, and is operated by a user to instruct the vehicle-mounted device 3 (control ECU 30) to lock (lock) the door.

The unlock switch 35 is a switch that is provided, for example, in the vicinity of a door handle disposed on the vehicle exterior side of each door of the vehicle 2. The unlock switch 35 is operated by a user to instruct the vehicle-mounted device 3 (control ECU 30) to unlock (open) the door. The unlock switch 35 is configured, for example, as a sensor (for example, a capacitance sensor) for detecting touch (contact) of the door handle by the user.

The lock switch 34 and the unlock switch 35 may be provided by a single switch (for example, a push switch). In this case, when the switch is operated in a door lock state, the control ECU 30 performs the processing assuming that an unlocking instruction has been issued. On the contrary, when the switch is operated in a door unlock state, the control ECU 30 performs the processing assuming that a locking instruction has been issued.

The door locking device 36 includes a locking mechanism that is provided for each door and locks the door, and a motor that operates the locking mechanism to lock the door or operates the locking mechanism to unlock the door.

The engine start switch 37 is a switch (for example, a push switch) that is provided on an instrument panel portion around a driver's seat in the vehicle interior and operated by the user to instruct the vehicle-mounted device 3 to start the engine of the vehicle 2.

The vehicle state detection sensor 38 is a sensor for detecting a predetermined state among various states of the vehicle 2, specifically, for example, a sensor for detecting the remaining amount of fuel for driving the engine, a temperature inside the vehicle, and the like.

The control ECU 30 is a control device that includes a CPU, a ROM, a RAM, and the like, and executes various processes relating to the electronic key system. The control ECU 30 is equipped with a memory 301 that stores various pieces of information on a ROM, a RAM, and the like. The memory 301 stores a program of a process executed by the control ECU 30, a master ID for authenticating the key 4, and the like.

The outline of the processing of the control ECU 30 will be described. When the user gets on the vehicle 2, the control ECU 30 controls the LF transmission unit 31 (vehicle exterior transmission unit) to transmit a request signal (radio wave A) toward a periphery area of the vehicle 2. When the RF receiving unit 32 receives the response signal transmitted from the key 4 in response to the request signal, the control ECU 30 checks the ID included in the response signal against the master ID of the control ECU 30. When the verification is successful, the control ECU 30 sets the door to an unlock permission state (a standby state of the unlock switch 35). Thereafter, when the unlock switch 35 has been operated, the control ECU 30 controls the door locking device 36 to unlock the door.

Further, in the situation of starting the engine of the vehicle 2, the control ECU 30 controls the LF transmission unit 31 (vehicle interior transmission unit) to transmit a request signal to the interior of the vehicle based on the fact that the engine start switch 37 has been operated. When the RF receiving unit 32 receives a response signal responsive to the request signal, the control ECU 30 performs the checking in the same manner as that described above, and instructs the engine ECU (not shown) to start the engine when the verification is successful.

When the user gets off the vehicle 2, the control ECU 30 controls the LF transmission unit 31 to transmit a request signal to the periphery of the vehicle 2 and the interior of the vehicle, based on the operation made by the user on the lock switch 34. The control ECU 30 controls the door locking device 36 to lock the door when the verification is successful based on the request signal transmitted to the exterior of the vehicle. When the verification is successful based on the request signal transmitted to the interior of the vehicle, the control ECU 30 stops locking the door and warns the user with a buzzer or the like of that the key 4 may be left in the interior of the vehicle.

When the RF receiving unit 32 receives the RF signal transmitted from the key 4 based on the operation made by the user on the switch 44 (refer to FIG. 3) as the processing relating to the RKE system, the control ECU 30 determines whether the received signal is a signal for instructing locking or a signal for instructing unlocking, and locks or unlocks the door according to the determination result.

The outline of the processing executed by the control ECU 30 is described above, which will be described in more detail later with reference to a flowchart.

Figure 3:
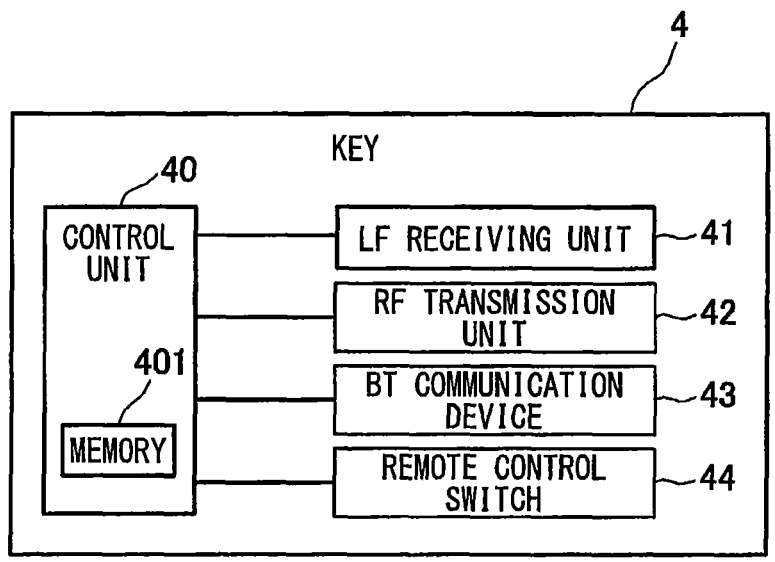
FIG. 3 is a configuration diagram of a key.

Next, a configuration of the key 4 will be described. As illustrated in FIG. 3, the key 4 includes an LF receiving unit 41, an RF transmission unit 42, a BT communication device 43, a remote control switch 44, and a control unit 40 to which those components are connected.

The LF receiving unit 41 receives the radio wave A of the request signal transmitted from the vehicle-mounted device 3. The RF transmission unit 42 transmits a response signal output from the control unit 40 as a radio wave of the RF band to the periphery of the key 4. A transmission range of the signal transmitted by the RF transmission unit 42 is set to, for example, about 10 meters to 100 meters from the key 4. In the present embodiment, as will be described later, the radio wave A of the request signal for authenticating the key 4 is also transmitted from the home device 6. The LF receiving unit 41 also receives the radio wave A from the home device 6, and the RF transmission unit 42 also transmits the RF radio wave responsive to the radio wave A.

The BT communication device 43 wirelessly communicates with surrounding wireless communication devices (the vehicle-mounted device 3 and the home device 6 in the present embodiment) having a communication function of Bluetooth (registered trademark) according to the Bluetooth (registered trademark) protocol. A communication range (communication distance) of the BT communication device 43 is set to an area (for example, an area of several tens of meters from the key 4) wider than the transmission range (transmission distance) of the request signal. The BT communication device 43 corresponds to a second communication device and a mobile device receiving unit.

The remote control switch 44 is a switch (for example, a push switch) that is exposed from a housing of the key 4 and is operated by the user to instruct locking or unlocking of the vehicle door. The remote control switch 44 may include two sub switches of a locking switch and an unlocking switch, or may be configured by a single switch without distinguishing locking switch and unlocking switch.

The control unit 40 includes a CPU, a ROM, a RAM, and the like, and executes various processes relating to the electronic key system. The control unit 40 is equipped with a memory 401 that stores various pieces of information on a ROM, a RAM, and the like. The memory 401 stores a program of a process executed by the control unit 40, an ID for authenticating the key 4, and the like.

The outline of the processing to be executed by the control unit 40 will be described. When the LF receiving unit 41 receives the request signal (radio wave A) from the vehicle-mounted device 3, the control unit 40 generates the response signal responsive to the received request signal and controls the response signal to be transmitted as an RF radio wave to the RF transmission unit 42. At this time, the response signal includes the ID stored in the memory 401.

When, for example, a challenge and response system is employed as the authentication system of the key 4, the control ECU 30 of FIG. 2 includes a challenge code configured by random numbers in the request signal. In addition, the control ECU 30 performs predetermined arithmetic processing on the challenge code included in the request signal, and stores a value obtained by the arithmetic processing in the memory 301 as a master ID. When receiving the request signal, the control unit 40 performs predetermined arithmetic processing on the challenge code included in the request signal, and includes the value obtained by the arithmetic processing in the response signal as an ID. The control ECU 30 checks the ID included in the response signal with the master ID stored in the memory 301 to authenticate the key 4. The arithmetic processing to be performed on the challenge code is adjusted in advance so as to perform the same processing between the control ECU 30 and the control unit 40.

When the remote control switch 44 is operated as a process related to the RKE system, the control unit 40 controls the RF transmission unit 42 to transmit a signal for instructing locking or unlocking the vehicle door as an RF radio wave.

Further, in the present embodiment, the key 4 is also used as a key for locking and unlocking the door of the home 5 (hereinafter referred to as "home door"). More specifically, the home 5 is equipped with an electronic key system capable of locking and unlocking the home door even without inserting a mechanical key into a key cylinder of the home door. The electronic key system of the home is similar to the electronic key system of the vehicle 2, that is, performs the bidirectional communication with the key 4. In the memory 401, an ID of the key 4 for the authentication performed by the home device 6 is stored. When the LF receiving unit 41 receives the radio wave (LF radio wave) of the request signal transmitted from the home device 6, the control unit 40 generates the response signal responsive to the received request signal and controls the RF transmission unit 42 to transmit RF radio wave of the response signal.

The outline of the processing executed by the control unit 40 is described above, which will be described in more detail later with reference to a flowchart.

Figure 4:
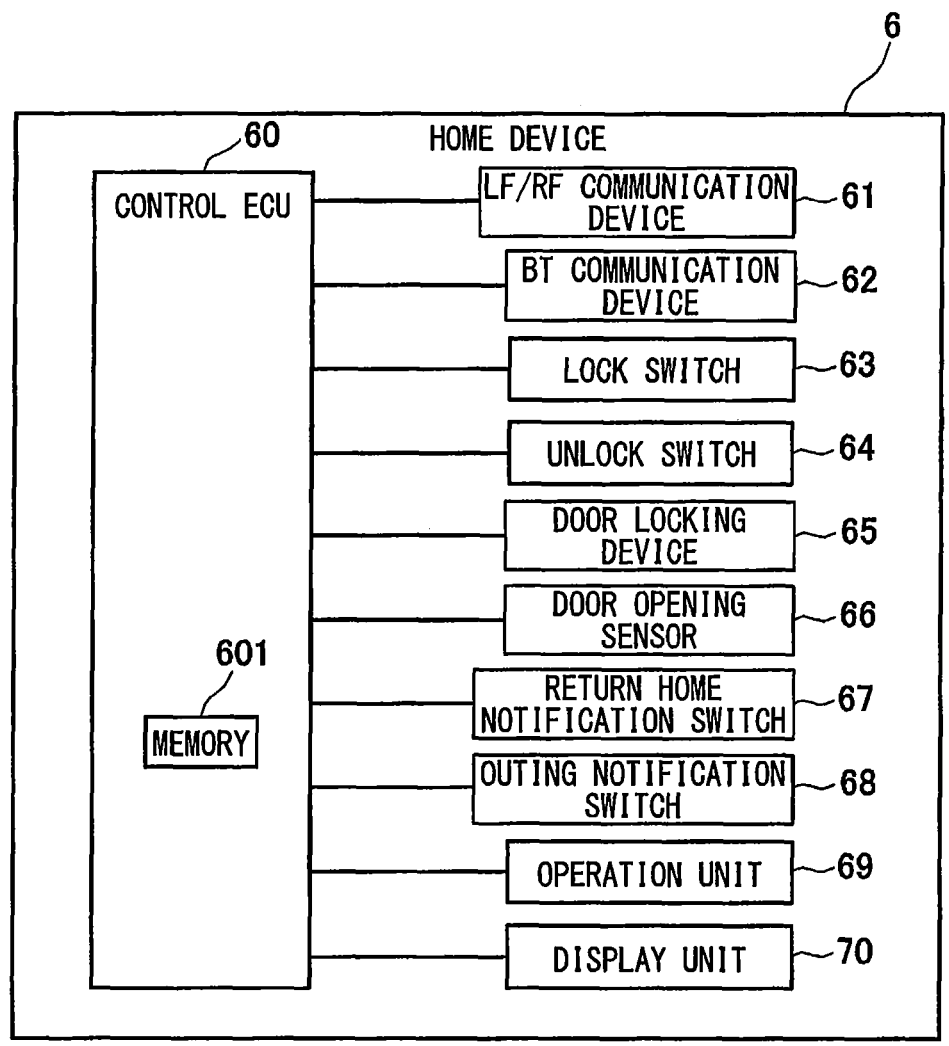
FIG. 4 is a configuration diagram of a home device.

Next, a configuration of the home device 6 will be described. As illustrated in FIG. 4, the home device 6 includes an LF/RF communication device 61, a BT communication device 62, a lock switch 63, an unlock switch 64, a door lock device 65, a door opening sensor 66, a return home notification switch 67, an outing notification switch 68, an operation unit 69, a display unit 70, and a control ECU 60 to which those components are connected.

The LF/RF communication device 61 includes an LF transmission unit equipped to the home door, and the LF transmission unit transmits a request signal for requesting a reply toward the periphery of the outside of the home door using the radio wave (having the same frequency band as the radio wave A of the LF transmission unit 31) of the LF band (for example, 125 kHz). Further, the LF/RF communication device 61 includes an RF receiving unit for receiving the RF radio wave transmitted from the key 4.

The BT communication device 62 wirelessly communicates with surrounding wireless communication devices (the vehicle-mounted device 3 and the key 4 in the present embodiment) having a communication function of Bluetooth (registered trademark) according to the communication protocol of Bluetooth (registered trademark). Communication ranges (communication distances) 103 and 104 (refer to FIG. 1) of the BT communication device 62 are set to areas that cover the home 5 with the inclusion of a home parking lot. The BT communication device 62 corresponds to a third communication device.

The lock switch 63 is a switch (for example, a push switch) that is provided around an outside knob of the home door, and is operated by the user to instruct the home device 6 (control ECU 60) to lock the home door.

The unlock switch 64 is a switch (for example, a push switch) that is provided around the outside knob of the home door and is operated by the user to instruct the home device 6 (control ECU 60) to unlock the home door. The lock switch 63 and the unlock switch 64 may be provided by a single switch (for example, a push switch). In this case, when the switch is operated in the lock state of the home door, the control ECU 60 performs the processing assuming that an unlocking instruction has been issued. On the contrary, when the switch is operated in the unlock state of the home door, the control ECU 30 performs the processing assuming that a locking instruction has been issued.

The door locking device 65 includes a locking mechanism that is provided in the home door and locks the door, and a motor that operates the locking mechanism to lock the door or unlock the door.

The door opening sensor 66 is a sensor for detecting unlock of the home door is opened.

The return home notification switch 67 is a switch for notifying the control ECU 60 that the user has returned home 5. The return home notification switch 67 may be configured as a switch (for example, a push switch) which is operated by the user, or as a switch which is turned on in conjunction with an operation performed by the user when the user returns home (for example, operation of the outside knob of the home door) (that is, a sensor that detects a user's operation when the user returns home). The return home notification switch 67 may be attached to a proper position of the home 5. Since it is assumed that the unlock switch 64 is operated when the user returns home, the return home notification switch 67 may be omitted and the unlock switch 64 may be used as the return home notification switch.

The outing notification switch 68 is a switch for notifying the control ECU 60 that the user goes out of the home 5. The outing notification switch 68 may be configured as a switch (for example, a push switch) which is operated by the user, or as a switch which is turned on in conjunction with an operation (for example, operation made on an inside knob of the home door) performed by the user when the user goes out (that is, a sensor that detects a user's going-out operation). The outing notification switch 68 may be attached to a proper position of the home 5. Since it is assumed that the lock switch 63 is operated when the user goes out, the outing notification switch 68 may be omitted and the lock switch 63 may be used as the outing notification switch.

The operation unit 69 includes a switch that is provided in the home (for example, an inner region with respect to the home door) and requests a remote control of the vehicle 2 (for example, engine start of the vehicle 2, operation of the air conditioning apparatus provided in the vehicle 2, and so on), and a switch that requests notification of a vehicle state (for example, the remaining amount of fuel for driving the engine, a temperature inside the vehicle, and so on).

The display unit 70 is provided in the home and displays various kinds of information. A vehicle state (for example, the remaining amount of fuel for driving the engine, the temperature inside the vehicle, and so on) is displayed on the display unit 70. As the display unit 70, various types of displays such as a liquid crystal display can be used.

The control ECU 60 is a control device that includes a CPU, a ROM, a RAM, and the like, and executes various processes. The control ECU 60 is equipped with a memory 601 that stores various pieces of information on a ROM, a RAM, and the like. The memory 601 stores a program of a process executed by the control ECU 60, a master ID for authenticating the key 4, and the like.

The outline of the processing to be executed by the control ECU 60 will be described. When the unlock switch 64 or the lock switch 63 is operated, the control ECU 60 instructs the LF/RF communication device 61 to transmit a request signal (LF radio wave) to the periphery of the outside of the home door. When the LF/RF communication device 61 receives the response signal (RF radio wave) transmitted from the key 4 in response to the request signal, the control ECU 60 checks the ID included in the response signal with the master ID stored in the memory 601. When the verification is successful, the control ECU 60 controls the door locking device 65 to unlock the home door (a case in which the unlock switch 64 is operated) or to lock (a case in which the lock switch 63 is operated). Details of the processing of the control ECU 60 will be described later.

A key cylinder (key insertion portion) into which a mechanical key is inserted is provided on the outside of the vehicle door and the home door. When a mechanical key is inserted into the key cylinder, the vehicle door or the home door can be locked and unlocked.

Next, details of processing to be executed by the vehicle-mounted device 3 (control ECU 30), the key 4 (control unit 40), and the home device 6 (control ECU 60) will be described. First, the processing of the control ECU 30 will be described with reference to FIG. 5. The processing of FIG. 5 is repeatedly executed in a predetermined cycle.

Figure 5:
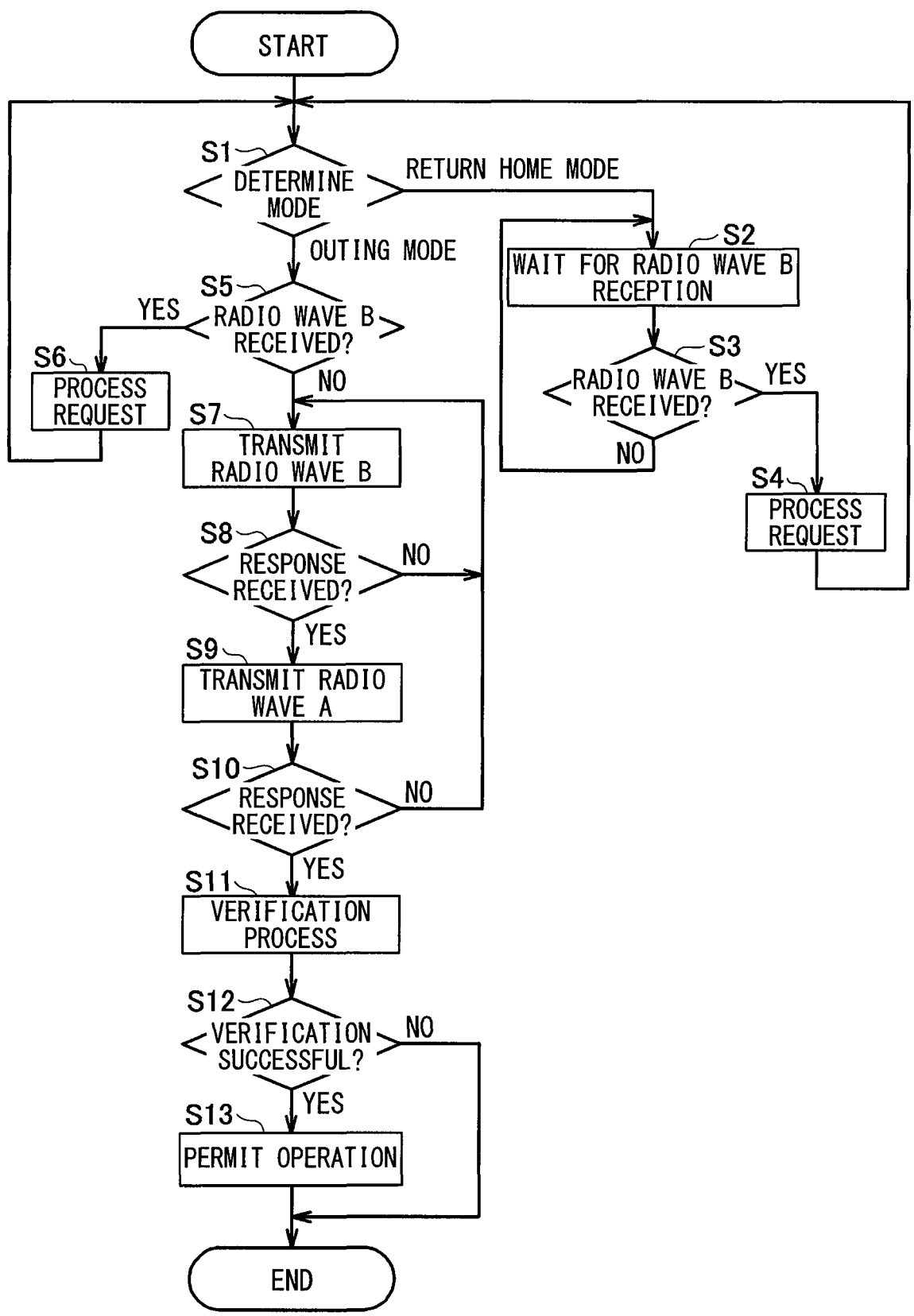
FIG. 5 is a flowchart of processing executed by a control ECU of the vehicle-mounted device.

When starting the processing in FIG. 5, the control ECU 30 determines whether a current mode set in the vehicle 2 is a return home mode (corresponding to a vehicle restriction mode) or an outing mode (S1). In this example, the return home mode is a mode set when the user has returned to the home 5 and is present in the home, in other words, a mode set when the vehicle 2 is present at the home 5. In this example, the outing mode is a mode set when the user is going out and absent from the home 5, in other words, a mode set when the vehicle 2 is at a place other than the home 5. The return home mode and the outing mode are set by the processing of S4 and S6 which will be described later.

When the current mode is the return home mode, the control ECU 30 waits for reception of radio waves (hereinafter referred to as "radio wave B") under the Bluetooth (registered trademark) communication protocol to be transmitted from the home device 6 (BT communication device 62) (S2). The control ECU 30 stops the transmission of the radio wave B by the BT communication device 33 and the transmission of the radio wave A by the LF transmission unit 31 when waiting for reception of the radio wave B from the home device 6.

Next, it is determined whether the radio wave B from the home device 6 has been received by the BT communication device 33, or not (S3). In FIG. 1, the radio wave B from the home device 6 is indicated by reference numeral 104. If the radio wave B has not been received (NO in S3), the process returns to S2 and continues to wait for receiving the radio wave B.

When the radio wave B from the home device 6 has been received (YES in S3), the control ECU 30 executes a request process indicated by the received signal of the radio wave B (S4). Specifically, when the user returns to the home 5, a signal (return home mode request signal) requesting for switching to the return home mode is transmitted from the home device 6 (S43 of FIG. 7). When the received signal is a return home mode request signal, the control ECU 30 executes a process of switching the mode of the vehicle 2 to the return home mode. Further, when the user goes out from the home 5, a signal (outing mode request signal) requesting for switching to the outing mode is transmitted from the home device 6 (S45 in FIG. 7). When the received signal is an outing mode request signal (corresponding to a restriction cancel signal), the control ECU 30 executes a process of switching the mode of the vehicle 2 to the outing mode in S4. It is assumed that the mode switching request signal received in the return home mode is a signal requesting for switching from the return home mode to the outing mode.

Figure 7:
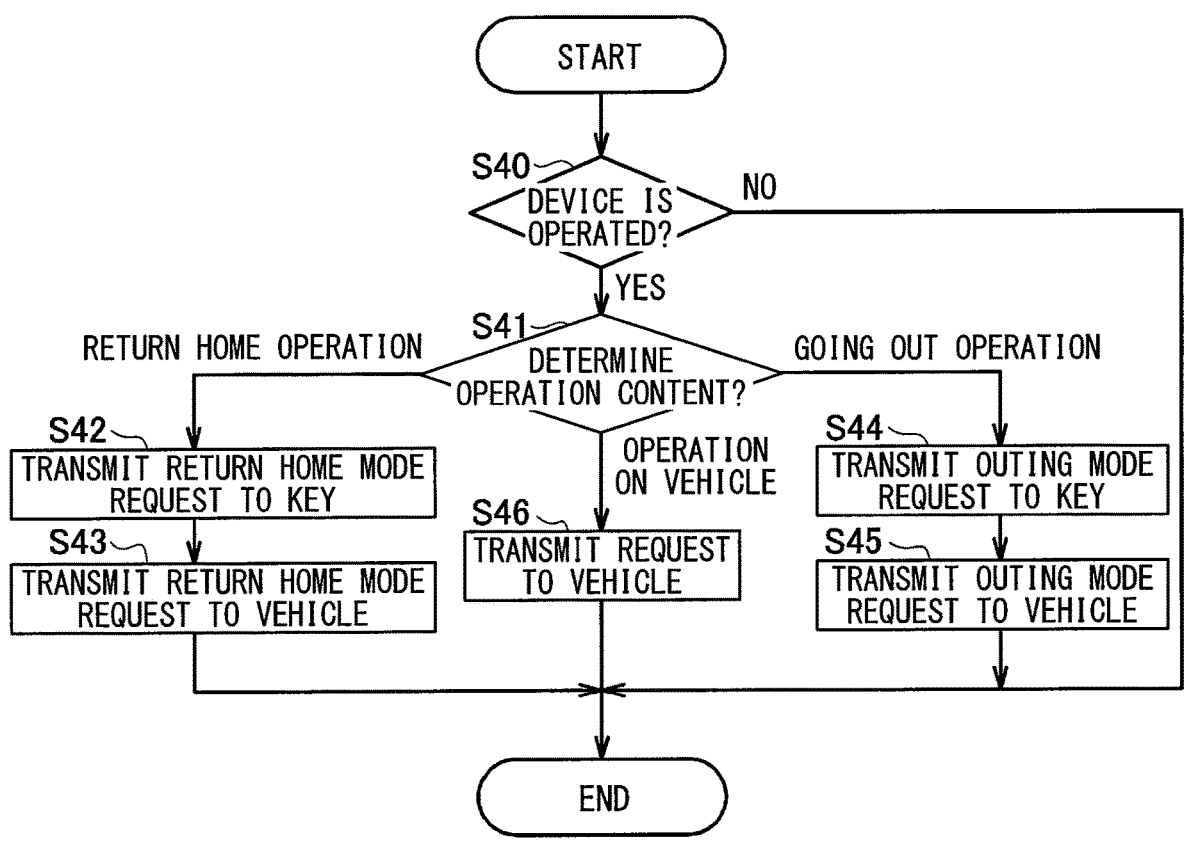
FIG. 7 is a flowchart of processing executed by the control ECU of the home device.

When the operation unit 69 (refer to FIG. 4) has been operated, a signal corresponding to the operation content of the operation unit 69 is transmitted from the home device 6 (S46 in FIG. 7). When the received signal is a signal based on the operation of the operation unit 69, the control ECU 30 executes processing corresponding to the received signal in S4. More specifically, in the case where the received signal is a signal instructing a remote control of the vehicle 2 (for example, engine start of the vehicle 2, operation of the air conditioning apparatus provided in the vehicle 2, and so on), the control ECU 30 executes the vehicle operation instructed by the received signal. In other words, the control ECU 30 starts the engine or operates the air conditioning apparatus, for example. As a result, before the user gets on the vehicle, the engine can be warmed up, the air conditioner is activated in the summer so as to lower a temperature inside the vehicle, and the heating operation is activated in the winter so as to raise the temperature inside the vehicle. Thus, the user's convenience can be improved.

When the received signal is a signal requesting for notification of the vehicle state, the control ECU 30 acquires, in S4, the vehicle state detected by the vehicle state detection sensor 38 (refer to FIG. 2) and transmits a signal indicating the acquired vehicle state to the home device 6 (BT communication device 62) as a response to the radio wave B with the use of the BT communication device 33. When the BT communication device 62 receives the signal indicating the vehicle state, the control ECU 60 of the home device 6 controls the display unit 70 to display the vehicle state indicated by the received signal. As a result, the vehicle state can be provided to the user who is in the home. For example, when the temperature inside the vehicle is high, the air conditioning apparatus of the vehicle 2 is remotely controlled by the user using the operation unit 69. Thus, the convenience of the user can be improved. After the processing in S4, the process returns to the processing in S1.

In this manner, in the return home mode, the vehicle-mounted device 3 merely receives the radio wave B from the home device 6 and executes the process according to the reception, and restricts the transmission of the radio wave B and the transmission of the radio wave A from the vehicle-mounted device 3.

When the current mode is determined to be the outing mode in S1, it is next determined whether the radio wave B from the home device 6 has been received, or not (S5). When the radio wave B has been received (YES in S5), the control ECU 30 executes a request process indicated by the received signal of the radio wave B as with the processing of S4 (S6). More specifically, for example, the mode is switched from the outing mode to the return home mode, the remote control of the vehicle 2 is executed, and the signal indicating the vehicle state is notified to the home device 6 with the use of the BT communication device 33. A situation of receiving the radio wave B from the home device 6 in the outing mode is assumed to be immediately after returning to the home 5, and since the situation is just after returning home, it is assumed that the mode is switched from the outing mode to the return home mode in S6. After the processing in S6, the process returns to the processing in S1.

When there is no reception of the radio wave B from the home device 6 (NO in S5), it is assumed that the vehicle 2 is in a place other than the home 5, and the control ECU 30 transmits the radio wave B to the key 4 with the use of the BT communication device 33 in order to detect the approach of the key 4 (user) to the vehicle 2 (S7). In FIG. 1, the radio wave B to be transmitted in S7 is indicated by reference numeral 102.

Next, it is determined whether there is a response from the key 4 to the radio wave B transmitted in S7, or not (S8). The determination of the presence or absence of a response in this example includes an authentication process as to whether the BT communication device 33 receives the radio wave B and the received radio wave B is a response radio wave from the key 4, or not. In other words, when the BT communication device 33 has received the radio wave B, the control ECU 30 checks the ID included in the received signal with the master ID stored in the memory 301 as the authentication process. When the verification is successful, the control ECU 30 determines that there is a response from the key 4. When the BT communication device 33 has not received the radio wave B, or when the BT communication device 33 has received the radio wave B but the verification is unsuccessful, it is determined that there is no response from the key 4.

When, for example, a challenge and response system is employed as the authentication system of the key 4, a challenge code configured by random numbers is included in the radio wave B in S7. In addition, the control ECU 30 performs predetermined arithmetic processing on the challenge code included in the radio wave B, and stores a value obtained by the arithmetic processing in the memory 301 as a master ID. When receiving the radio wave B, the control unit 40 performs predetermined arithmetic processing on the challenge code included in the radio wave B, and includes the value obtained by the arithmetic processing in the response radio wave B as an ID. The control ECU 30 checks the ID included in the received response radio wave B with the master ID stored in the memory 301 to authenticate the key 4. The arithmetic processing to be performed on the challenge code is adjusted in advance so as to perform the same processing between the control ECU 30 and the control unit 40.

When there is no response from the key 4 (NO in S8), the process returns to S7 and the radio wave B is transmitted again. In other words, the radio wave B is repeatedly transmitted until receiving a response from the key 4.

When receiving a response from the key 4 (YES in S8), the control ECU 30 then controls the LF transmission unit 31 (vehicle exterior transmission unit) to transmit the radio wave A (request signal) to a periphery 101 (refer to FIG. 1) of the vehicle 2 (S9). In S9, the radio wave A may be transmitted under a condition that the unlock switch 35 (refer to FIG. 2) has been operated. In this case, a process of determining whether the unlock switch 35 has been operated, or not, is added between S8 and S9, and when the unlock switch 35 has been operated, the process proceeds to S9, and when there is no unlock operation, the process returns to S7.

In the above description, a situation where the vehicle door is unlocked is assumed, but in a situation where the vehicle door is locked after getting off the vehicle, the radio wave A may be transmitted under a condition that the lock switch 34 (refer to FIG. 2) has been operated. In this case, a process of determining whether the lock switch 34 has been operated, or not, is added between S8 and S9, and when the lock switch 34 has been operated, the process proceeds to S9, and when there is no lock operation, the process returns to S7.

In a situation where the engine starts, when there is a response in S8 (YES in S8), the control ECU 30 controls the LF transmission unit 31 (vehicle interior transmission unit) to transmit the radio wave A to the vehicle interior under a condition that the engine start switch 37 has been operated (S9).

Next, as the determination as to whether there is a response to the radio wave A, or not, it is determined whether the RF receiving unit 32 has received the RF radio wave, or not (S10). If there is no response (NO in S10), the process returns to S7 and the radio wave B is transmitted again. In other words, until receiving a response to the radio wave A, it is continued to check whether the key 4 is located in the communication range 102 (refer to FIG. 1) of the BT communication device 33, or not. While the key 4 stays in the communication range 102, the radio wave A is repeatedly transmitted. In addition, in the case where the key 4 is once located in the communication range 102 but thereafter deviates from the communication range 102, the transmission of the radio wave A is stopped.

In a situation that there is a response from the key 4 to the radio wave B and there is no response from the key 4 to the radio wave A, it is assumed that although the key 4 is located in the communication range 102 of the BT communication device 33, the key 4 does not approach the communication area 101 of the LF transmission unit 31.

When there is a response to the radio wave A, that is, when the RF receiving unit 32 has received the RF radio wave (YES in S10), the ID included in the received signal is checked against the master ID stored in the memory 301 (S11) and it is determined whether the verification is successful, or not (S12). If the verification is successful (YES in S12), the operation of the vehicle 2 according to the instruction, specifically, the unlocking and locking of the vehicle door and the engine starting are permitted (S13). Thereafter, the processing in the flowchart of FIG. 5 is completed. When the verification is unsuccessful, the operation of the vehicle 2 is not permitted, and the processing of the flowchart in FIG. 5 is completed.

As described above, in the outing mode, the radio wave A is transmitted when the key 4 is located in the communication range 102 of the BT communication device 33, and when the key 4 is located outside the communication range 102, the transmission of the radio wave A is restricted. In addition, the operation of the vehicle 2 is permitted only when the vehicle 2 is in the outing mode, the key 4 is located in the communication range 102 of the BT communication device 33, there is a response from the key 4 to the radio wave A, and the verification is successful.

Next, the details of the processing to be executed by the key 4 (control unit 40) will be described with reference to FIG. 6. The key 4 enters an intermittent operation mode while the processing is not executed, and the processing of FIG. 6 starts at a wake-up time when the key 4 wakes up from the intermittent operation mode.

Figure 6:
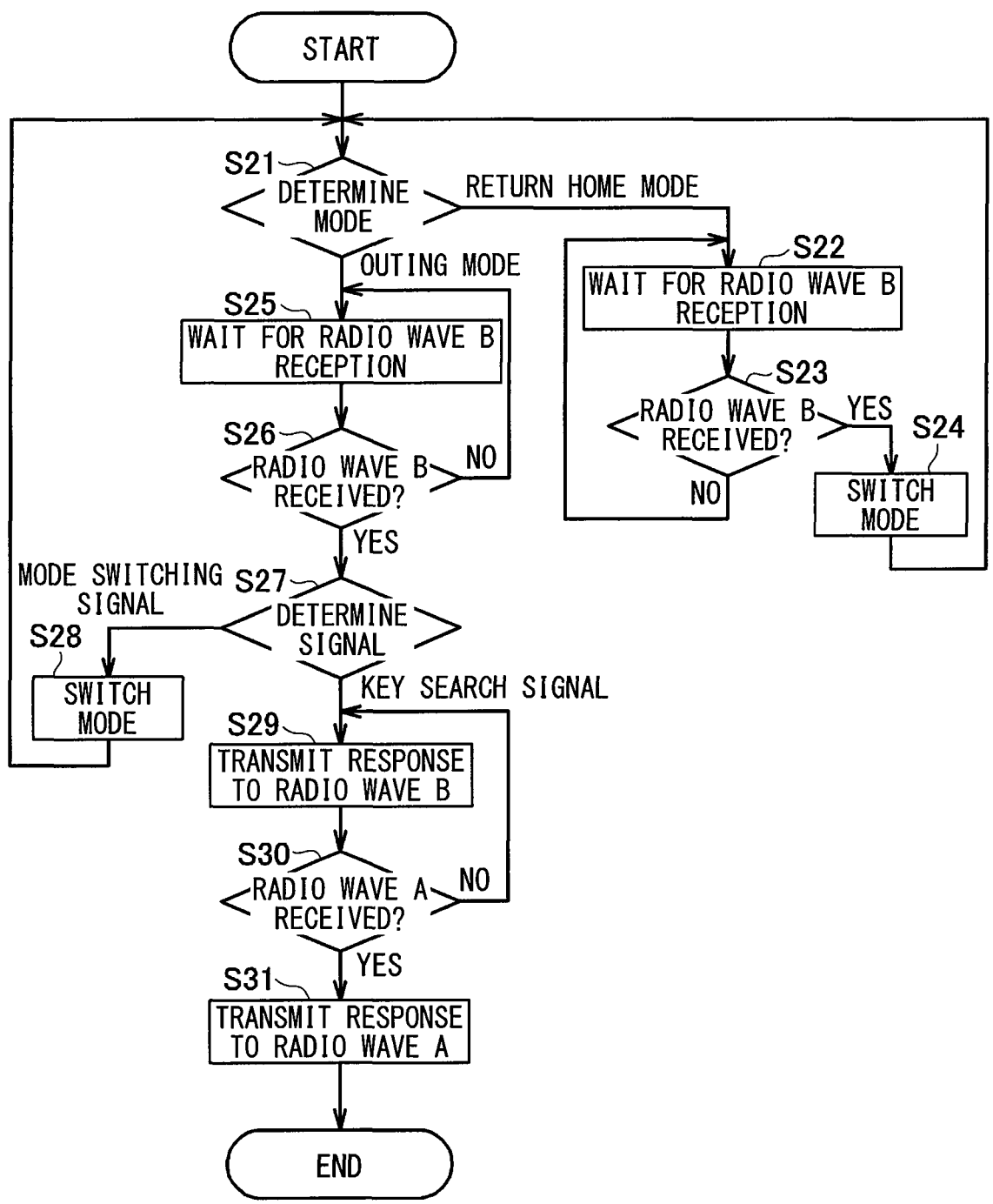
FIG. 6 is a flowchart of processing executed by a control unit of the key.

When starting the processing in FIG. 6, the control unit 40 determines whether the current mode set in the key 4 is the return home mode (corresponding to a response restriction mode) or the outing mode (S21). In this example, the return home mode is a mode set when the user has returned to the home 5, in other words, a mode set when the key 4 is at the home 5. In this example, the outing mode is a mode set when the user is going out from the home 5, in other words, a mode set when the key 4 is at a place other than the home 5. The return home mode and the outing mode are set by the processing of S24 and S28 which will be described later.

When the current mode is determined to be the return home mode, the key 4 waits for reception of the radio wave B from the home device 6 (BT communication device 62) (S22). While waiting for reception of the radio wave B, the key 4 performs the intermittent operation. Next, it is determined whether the radio wave B from the home device 6 has been received by the BT communication device 43, or not (S23). In FIG. 1, the radio wave B transmitted from the home device 6 to the key 4 is indicated by reference numeral 103. When the radio wave B has not been received (NO in S23), the process returns to S22 and continues to wait for receiving the radio wave B.

When the radio wave B from the home device 6 has been received (YES in S23), the control unit 40 executes a request process indicated by the received signal of the radio wave B (S24). Specifically, when the user returns to the home 5, a signal (return home mode request signal) requesting for switching to the return home mode is transmitted from the home device 6 (S42 of FIG. 7). When the received signal is a return home mode request signal (corresponding to an operation restriction signal), the control unit 40 executes a process of switching the mode of the key 4 to the return home mode in S24. Further, when the user goes out from the home 5, a signal (outing mode request signal) requesting for switching to the outing mode is transmitted from the home device 6 (S44 in FIG. 7). When the received signal is an outing mode request signal, the control unit 40 executes a process of switching the mode of the key 4 to the outing mode in S24. In this manner, in S24, the process of switching the mode is performed. It is assumed that the mode switching request signal received in the return home mode is a signal (outing mode request signal) requesting for switching from the return home mode to the outing mode. Upon reception of the radio wave B, the key 4 transitions to a wake-up state until the mode is switched in S24. After the mode is switched in S24, the key 4 again transitions to the intermittent operation mode. After the processing in S24, the process returns to the processing in S21.

In this manner, in the return home mode, the key 4 merely receives the radio wave B from the home device 6 and executes the process according to the received signal of the radio wave B. In the return home mode, even when the radio wave A is transmitted from the vehicle-mounted device 3, the control unit 40 restricts a response to the radio wave A.

When the current mode is determined to be the outing mode in S21, the control unit 40 waits for the reception of the radio wave B (S25), and determines whether the radio wave B has been received, or not (S26). In the outing mode, there are both of a case in which the key 4 is located at a place other than the home 5, and a case in which the user has returned to the home 5 just now, that is, the key 4 is at the home 5. When the key 4 and the vehicle 2 are at a place other than the home 5, the radio wave B is transmitted from the vehicle-mounted device 3 to the key 4 (S7 in FIG. 5). When the key 4 and the vehicle 2 are at the home 5, the radio wave B is transmitted from the home device 6 to the key 4 (S42 and S44 in FIG. 7). For that reason, in S25 and S26, there are a case in which the radio wave B is transmitted from the vehicle-mounted device 3 and a case in which the radio wave B is transmitted from the home device 6.

If the radio wave B has not been received (NO in S26), the process returns to S25 and continues to wait for receiving the radio wave B. When the radio wave B has been received (YES in S26), the content of the received signal is determined (S27). Specifically, in S27, it is determined whether the received signal is a signal (mode switching signal) requesting mode switching transmitted from the home device 6 in S42 and S44 of FIG. 7, or a signal (key search signal) for detecting the approach of the key 4 transmitted from the vehicle-mounted device 3 in S7 of FIG. 5.

In the case of the mode switching signal, the mode of the key 4 is switched to the mode indicated by the mode switching signal (return home mode or outing mode) (S28). It is assumed that the mode switching signal received in the outing mode is a signal requesting for switching from the outing mode to the return home mode. Upon reception of the radio wave B, the key 4 transitions to a wake-up state until the mode is switched in S28. After the mode has been switched in S28, the key 4 again transitions to the intermittent operation mode. After the processing in S28, the process returns to the processing in S21.

When the received signal is a key search signal, a signal responsive to the key search signal is generated, and the generated response signal is transmitted to the vehicle-mounted device 3 with the use of the BT communication device 43 (S29). At this time, an ID for authenticating the key 4 is included in the response signal (radio wave B).

Next, it is determined whether the radio wave A (request signal) from the vehicle-mounted device 3 has been received by the LF receiving unit 41, or not (S30). If not received (NO in S30), the process returns to S29, and a response to the subsequent key search signal is transmitted each time the key search signal (radio wave B) is received. While the key search signal is continuously received, the key 4 is switched from the intermittent operation mode to a continuous operation mode.

When the LF receiving unit 41 receives the radio wave A (YES in S30), the control unit 40 generates a response signal including an ID for authenticating the key 4, and controls the RF transmission unit 42 to transmit the RF radio wave of the response signal (S31). Thereafter, the process of the flowchart in FIG. 6 is completed. The key 4 transmits the response signal in S31 and then transitions again to the intermittent operation mode.

As described above, in the outing mode, a response (response signal) to the radio wave A is transmitted when the key 4 is located in the communication range 102 of the BT communication device 33. When the key 4 is located outside the communication range 102, the response to the radio wave A is restricted. In other words, in the outing mode, the response to the radio wave A is permitted under a condition that the key 4 is located in the communication range 102 of the BT communication device 33.

Next, the details of the processing to be executed by the home device 6 (control ECU 60) will be described with reference to FIG. 7. The processing of FIG. 7 is repeatedly executed in a predetermined cycle.

When starting the process in FIG. 7, the control ECU 60 determines whether one of various operation units or switches provided to the home device 6 has been operated, or not (S40). When there is no operation (NO in S40), the processing of FIG. 7 is terminated. When there is an operation (YES in S40), the content of the operation is determined (S41). Specifically, it is determined whether the operation is a return home operation which is performed when the user returns to the home 5, a going out operation which is performed when the user present at the home 5 goes out of the home 5, or an operation on the vehicle 2 made using the operation unit 69.

In this example, the return home operation is specifically, for example, the operation performed on the return home notification switch 67, the operation performed on the unlock switch 64, or the operation of opening the home door using the outside knob of the home door. When the operation of opening the home door using the outside knob of the home door is set as the return home operation, the return home notification switch 67 is configured as a switch (sensor for detecting the outside knob operation) that is turned on in conjunction with the operation of the outside knob of the home door. When the return home notification switch 67 is turned on and the door opening sensor 66 detects that the home door is opened, it is determined that the return home operation is performed. In addition, a sensor for detecting an insertion of the mechanical key into the key cylinder of the home door's outer surface may be provided to detect the insertion of the mechanical key. In this case, when the home door is unlocked by the mechanical key, execution of the return home operation is determined by the sensor.

In addition, the going out operation is specifically, for example, the operation performed on the outing notification switch 68, the operation performed on the lock switch 63, or the operation of opening the home door using the inside knob of the home door. When the operation of opening the home door using the inside knob of the home door is set as the going out operation, the outing notification switch 68 is configured as a switch (sensor for detecting the inside knob operation) that is turned on in conjunction with the operation of the inside knob of the home door. When the outing notification switch 68 is turned on and the door opening sensor 66 detects that the home door is opened, it is determined that the going out operation is performed. In addition, a sensor for detecting an insertion of the mechanical key into the key cylinder of the home door's outer surface may be provided to detect the insertion of the mechanical key. In this case, when the home door is locked by the mechanical key, execution of the going out operation is determined by the sensor.

In the case where the operation content is the return home operation in S41, the control ECU 60 controls the BT communication device 62 to transmit the radio wave B of the return home mode request signal for requesting the key 4 and the vehicle 2 (vehicle-mounted device 3) to switch to the return home mode (S42, S43). Thereafter, the processing in the flowchart of FIG. 7 is completed.

In the case where the operation content is the going out operation, the control ECU 60 controls the BT communication device 62 to transmit the radio wave B of the outing mode request signal for requesting the key 4 and the vehicle 2 (vehicle-mounted device 3) to switch to the outing mode (S44, S45). Thereafter, the processing in the flowchart of FIG. 7 is completed.

Further, when the operation content is the operation of the operation unit 69, the control ECU 60 controls the BT communication device 62 to transmit the radio wave B of a signal corresponding to the operation of the operation unit 69, specifically, a signal for instructing a remote control of the vehicle 2 (for example, an engine start of the vehicle 2, the actuation of the air conditioning apparatus provided in the vehicle 2, and so on) and a signal for requesting notification of the vehicle state (S46). Thereafter, the processing in the flowchart of FIG. 7 is completed.

As described above, in the present embodiment, when the user returns to the home 5, the vehicle-mounted device 3 and the key 4 are set to the return home mode by the radio wave B transmitted from the home device 6. In the return home mode, even when the key 4 is located in the communication range of the BT communication device 33, the transmission of the radio waves A and B from the vehicle 2 is restricted and the response of the key 4 to the radio wave A is restricted. Therefore, damage caused by a relay attack can be effectively prevented when the user is at the home 5.

In addition, when the user goes out from the home 5 after setting the return home mode, the return home mode of the vehicle-mounted device 3 and the key 4 is canceled by the radio wave B transmitted from the home device 6, and the outing mode is set in the vehicle-mounted device 3 and the key 4. This makes it possible to prevent the operations of the vehicle-mounted device 3 and the key 4 from being restricted in spite of the vehicle-mounted device 3 and the key 4 are in the outing mode.

Further, in the outing mode, under a condition that a communication of Bluetooth (registered trademark) between the key 4 and the vehicle-mounted device 3 is established, the transmission of the radio wave A from the vehicle-mounted device 3 and a response of the key 4 to the radio wave A are performed. When the communication is not established, the transmission of the radio wave A from the vehicle-mounted device 3 and the response of the key 4 to the radio wave A are restricted. That is, when the key 4 is far from the vehicle 2 so that the Bluetooth (registered trademark) communication cannot be established, the transmission of the radio wave A and the response to the radio wave A are restricted. For that reason, the damage caused by the relay attack can be effectively reduced as compared with a conventional configuration in which the transmission of the radio wave A and the response to the radio wave A are performed without depending on the position of the key 4.

In addition, the radio wave B is a radio wave under the Bluetooth (registered trademark) communication protocol, and is different from the radio wave A. When a third party has a repeater that relays the LF radio wave and the RF radio wave, the radio wave B can be prevented from being relayed by the relay device that relays the LF radio wave and the RF radio wave.

Further, the communication range 102 of the radio wave B from the vehicle-mounted device 3 is set to be wider than the communication range 101 of the radio wave A. Thus, failure in establishment of the communication of the radio wave B between the vehicle-mounted device 3 and the key 4 can be prevented when the key 4 approaches the communication range 101 of the radio wave A. Also, before the key 4 approaches the communication range 101 of the radio wave A, the key 4 can be woken up upon receiving of the radio wave B transmitted from the vehicle-mounted device 3. Thus, when the key 4 enters the communication range 101 of the radio wave A, a responsiveness of the radio wave A by the key 4 can be improved. On the vehicle-mounted device 3 side, the key 4 can be detected within a further range compared with the communication range 101 of the radio wave A. At this time, for example, in the case where the vehicle 2 is provided with a welcome light function for turning on an outside light of the vehicle 2 in response to the user's approach, the welcome light function can be activated from a further position, and the user can easily find the vehicle 2.

The communication between the vehicle-mounted device 3 and the home device 6 and the communication between the key 4 and the home device 6 are performed under the Bluetooth (registered trademark) communication protocol that is the same as the communication protocol of the radio wave B between the vehicle-mounted device 3 and the key 4. Therefore, each configuration of the vehicle-mounted device 3, the home device 6, and the key 4 can be simplified as compared with the case where the different communication protocols are employed.

Further, in the present embodiment, since the electronic key system is also provided in the home 5 and the key used in the electronic key system of the home 5 is shared with the key 4 used in the electronic key system of the vehicle 2, the number of keys possessed by the user can be reduced.

In the present embodiment, the control ECU 30 that executes the processing of S7 to S9 in FIG. 5 corresponds to the transmission control unit. The control ECU 30 that executes the processing of S4 in FIG. 5 corresponds to a vehicle mode setting unit. Further, the control unit 40 that executes the processing of S25 to S27 and S29 to S31 in FIG. 6 corresponds to a response control unit. Further, the control ECU 60 that executes the processing of S42 to S45 in FIG. 7 corresponds to a communication control unit. Further, the control unit 40 that executes the processing of S24 and S28 in FIG. 6 corresponds to a mobile device mode setting unit. The control ECU 60 that executes the processing of S40 and S41 in FIG. 7, and the unlock switch 64, the door opening sensor, and the outing notification switch 68 in FIG. 4 correspond to an outing detection unit.

(Second Embodiment)

Next, a second embodiment will be described focusing on portions different from the above embodiment. A configuration of a vehicle control system according to the present embodiment is the same as that of the first embodiment (FIGS. 1 to 4). The process to be executed by a control ECU 30 of a vehicle-mounted device 3 (process of FIG. 5) is different from that of the first embodiment. Remaining configuration is the same as the first embodiment. Hereinafter, the processing to be executed by the control ECU 30 in the present embodiment will be described.

Figure 8:
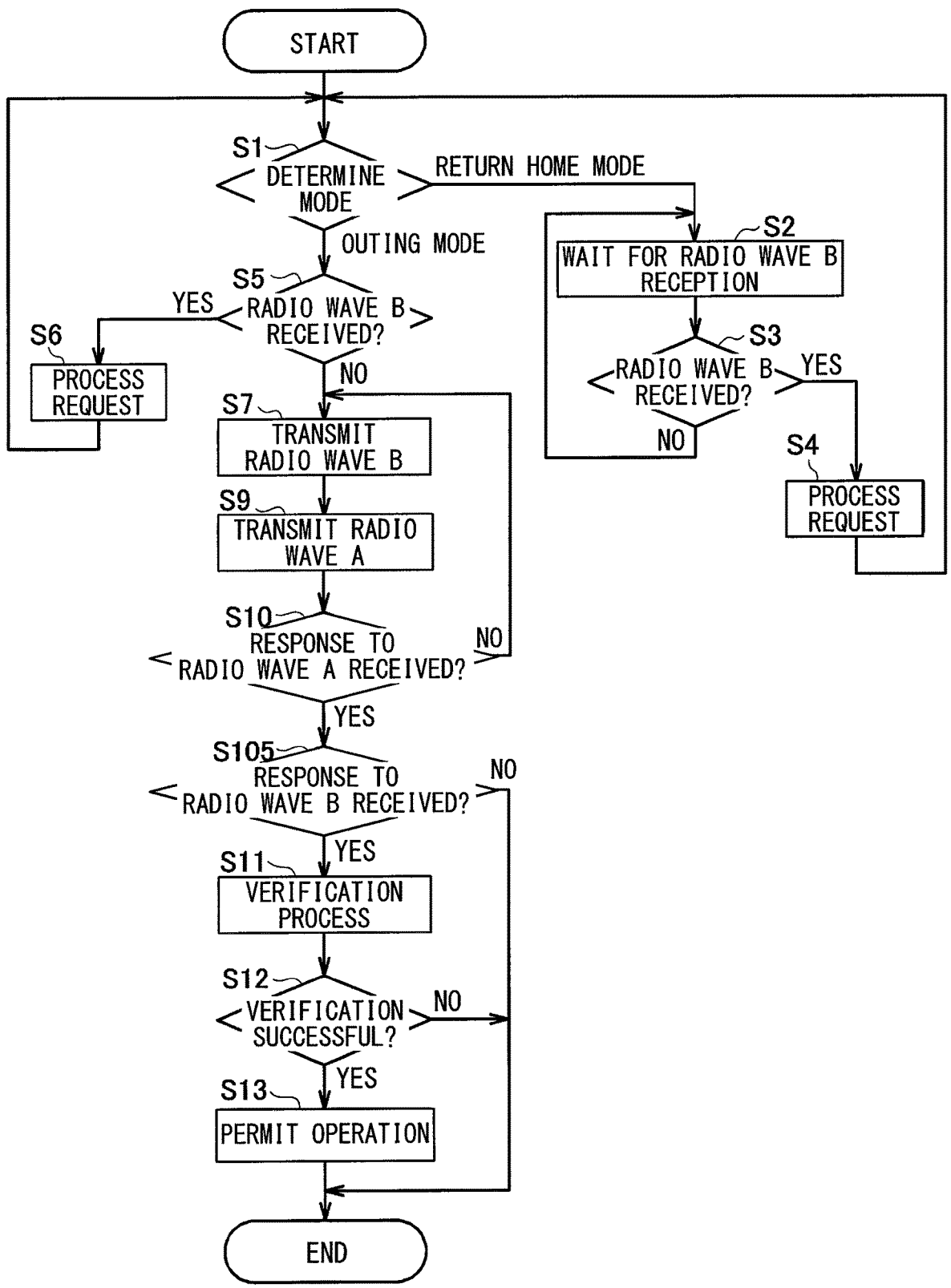
FIG. 8 is a flowchart of processing executed by a control ECU of a vehicle-mounted device according to a second embodiment.

FIG. 8 illustrates a flowchart of processing to be executed by the control ECU 30 according to the present embodiment. In FIG. 8, the same processes as those in FIG. 5 are denoted by identical symbols. In the processing of FIG. 8, the processing of S8 in FIG. 5 is omitted, and the process corresponding to S8 is added as S105 between S10 and S11.

In other words, in the processing of FIG. 8, when there is no reception of a radio wave B from a home device 6 in an outing mode (NO in S5), the radio wave B is transmitted to a key 4 (S7), and a radio wave A is transmitted regardless of the presence or absence of a response to the radio wave B (S9).

Next, the presence or absence of the response to the radio wave A is determined (S10). When there is no response to the radio wave A (NO in S10), the process returns to S7. When there is a response to the radio wave A (YES in S10), it is further determined whether there is a response to the radio wave B transmitted in S7, or not (S105). When there is the response to the radio wave B (YES in S105), the operation of the vehicle 2 is permitted under a condition that the verification is successful (S11 and YES in S12) (S13). When there is no response to the radio wave B (NO in S105), the operation of the vehicle 2 is not permitted, and the processing of FIG. 8 is terminated. In other words, when there is no response to the radio wave B, the response to the radio wave A is ignored.

Since the transmission range 101 of the radio wave A is smaller than the transmission range 102 of the radio wave B (refer to FIG. 1), when there is the response to the radio wave A, it is assumed that there is also the response to the radio wave B. When the radio wave A and the radio wave responsive to the radio wave A are relayed by a third party, it is determined that there is no response to the radio wave B in S105. Thus, an illegal operation of the vehicle 2 can be reduced.

As described above, in the present embodiment, the radio wave A is transmitted from the vehicle-mounted device 3 irrespective of whether the communication by the radio wave B between the vehicle-mounted device 3 and the key 4 is established, or not. When there is the response to the radio wave A but the communication by the radio wave B between the vehicle-mounted device 3 and the key 4 is not established, the operation of the vehicle 2 is not permitted. This also makes it possible to effectively reduce a damage caused by a relay attack.

In the present embodiment, the control ECU 30 that executes the processing of S7, S9, S10, S105, and S11 to S13 in FIG. 8 corresponds to an operation control unit.

(Third Embodiment)

Figure 9:
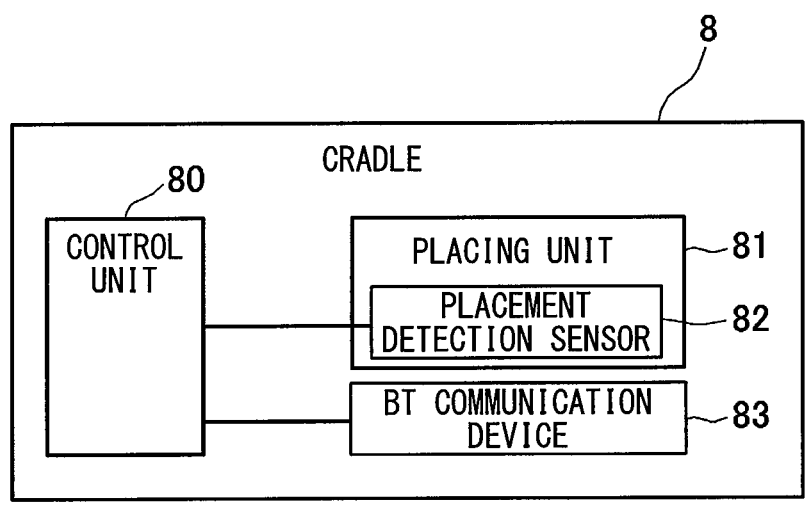
FIG. 9 is a configuration diagram of a cradle.

Next, a third embodiment will be described focusing on portions different from the embodiments described above. In the above embodiments, the home device 6 is provided to the home 5. In the present embodiment, instead of the home device 6, a cradle 8 shown in FIG. 9 is provided to the home 5, and the cradle 8 corresponds to an invalidation device.

The cradle 8 is a device capable of placing a key 4 and capable of communicating with the placed key 4. As illustrated in FIG. 9, the cradle 8 is equipped with a placing unit 81 on which the key 4 can be placed, a placement detection sensor 82 for detecting that the key 4 is placed on the placing unit 81, a BT communication device 83 corresponding to a third communication device that performs a wireless communication with the key 4 placed on the placing unit 81 according to the Bluetooth (registered trademark) communication protocol, and a control unit 80 to which those components are connected.

The placement detection sensor 82 may be, for example, a pressure sensor for detecting pressure applied to the placing unit 81 or a switch which is switched on when the key 4 is placed on the placing unit 81.

A communication range of the BT communication device 83 is set within an area that covers the placing unit 81 so as to be communicable with the key 4 placed on the placing unit 81.

The control unit 80 includes a CPU, a ROM, a RAM and the like, and controls the BT communication device 83 so as to wirelessly communicate with the key 4 when it is detected by the placement detection sensor 82 that the key 4 is placed on the placing unit 81. On the contrary, when the key 4 is removed from the placing unit 81, the control unit 80 stops the operation of the BT communication device 83.

Instead of the wireless communication by the BT communication device 83, a contact point may be provided to the key 4 and a contact point may be provided to the placing unit 81. When the contact points of the key 4 and the placing unit 81 come in contact with each other when the key 4 is placed on the placing unit 81, a wired communication is performed through the contact points of the key 4 and the placing unit 81. In this case, the cradle 8 is provided with a wired communication device instead of the BT communication device 83, and the key 4 is provided with a communication device capable of communicating with the wired communication device of the cradle 8.

The vehicle-mounted device 3 (the control ECU 30) executes the processing of FIG. 5 except process related to the home device 6. Specifically, the processing of S1 to S6 in FIG. 5 is not executed, and the control ECU 30 executes the processing of S7 to S13. As described above, also in the present embodiment, the vehicle-mounted device 3 transmits the radio wave A only when a communication of the radio wave B with the key 4 is established.

Figure 10:
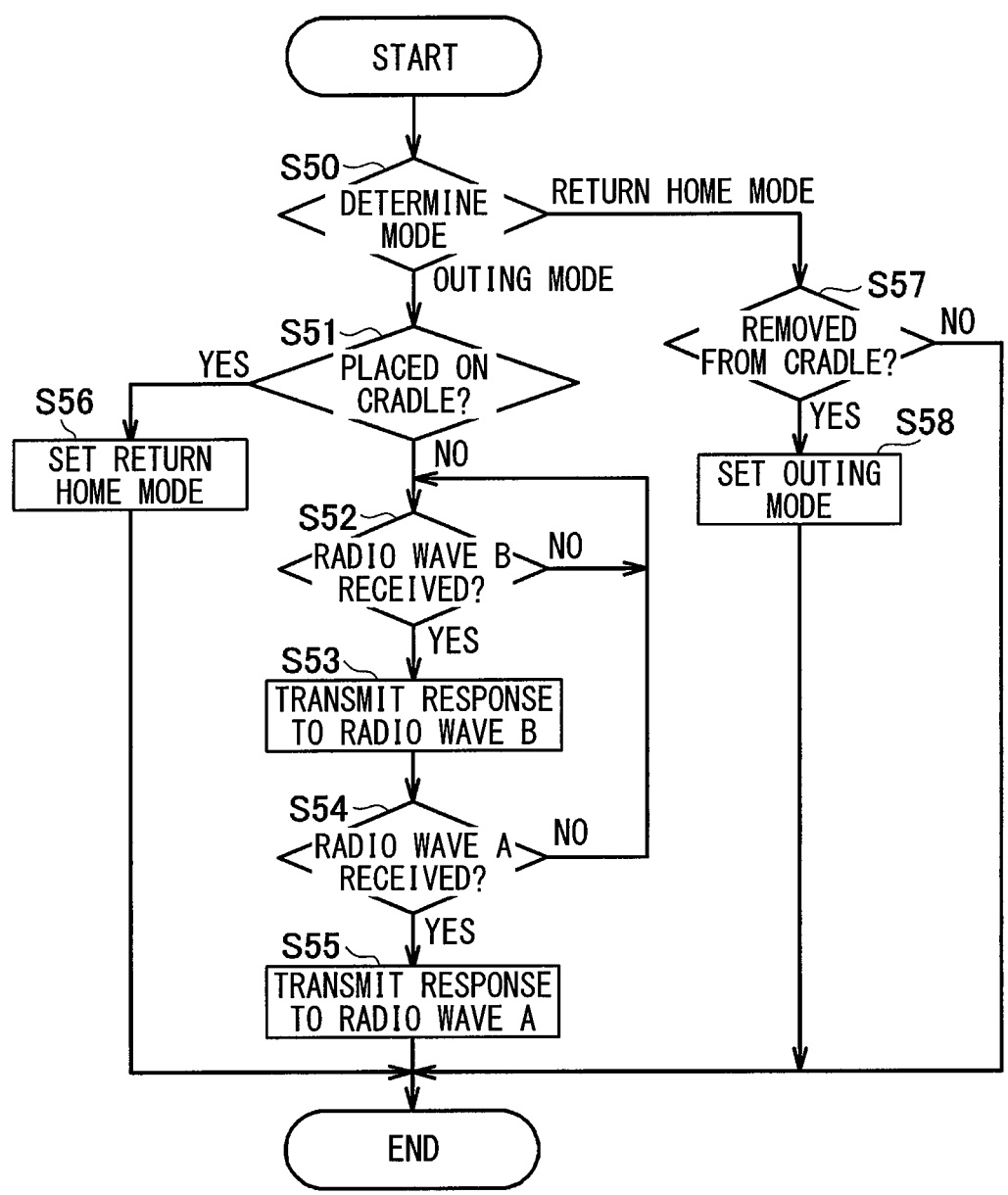
FIG. 10 is a flowchart of processing executed by a control unit of a key according to a third embodiment.

The key 4 (control unit 40) executes the process of FIG. 10 instead of the processing of FIG. 6. Hereinafter, the processing in FIG. 10 will be described. The processing of FIG. 10 is repeatedly executed in a predetermined cycle.

When starting the processing in FIG. 10, the control unit 40 determines whether the current mode set in the key 4 is the return home mode or the outing mode (S50). Although the meanings of the return home mode and the outing mode are the same as those in the above embodiment. Specifically, in the present embodiment, a state in which the key 4 is placed on the cradle 8 (placing unit 81) is defined as the return home mode, and a state in which the key 4 is removed from the cradle 8 is defined as the outing mode.

When the current mode is the return home mode, it is determined whether the key 4 is removed from the cradle 8, or not, from a state that the key 4 is placed on the cradle 8 (S57). Specifically, it is determined whether a communication between the BT communication device 83 of the cradle 8 and the BT communication device 43 (corresponding to a fourth communication device) of the key 4 is established or not (it is determined whether the BT communication device 43 has received a signal from the BT communication device 83, or not). When the communication is established, it is determined that the key 4 is placed on the cradle 8. When the communication is not established, it is determined that the key 4 is removed from the cradle 8.

When the key 4 remains in placed state on the cradle 8 (NO in S57), the return home mode is maintained and the process of FIG. 10 is terminated. On the other hand, when the key 4 is removed from the cradle 8 (YES in S57), it is highly assumed that the user goes out of the home 5. Thus, the mode of the key 4 is switched from the return home mode to the outing mode (S58). Thereafter, the processing in FIG. 10 is completed.

When the current mode is the outing mode in S50, it is determined whether the key 4 is placed on the cradle 8 (S51) from a removed state in the same manner as that of the processing of S57. When the key 4 is placed on the cradle 8 (YES in S51) from the removed state, it is assumed that the user has returned to the home 5, and the mode of the key 4 is switched from the outing mode to the return home mode.

When the key 4 remains separated from the cradle 8 (NO in S51), it is next determined whether the radio wave B from the vehicle-mounted device 3 has been received by the BT communication device 43, or not, on the assumption that the user (the key 4 and the vehicle 2) is in a place other than the home 5 (S52). When there is no reception of the radio wave B (NO in S52), the control unit 40 waits for the reception.

When the radio wave B has been received (YES in S52), the same processing as that in S29 to S31 of FIG. 6 is executed. In other words, the control unit 40 controls the BT communication device 43 to respond to the radio wave B (S53), and determines whether the radio wave A has been received, or not (S54). When the radio wave A has not been received (NO in S54), the process returns to S52. When the radio wave A has been received (YES in S54), the control unit 40 controls the RF transmission unit 42 to respond to the radio wave A (S55). Thereafter, the processing in FIG. 10 is completed.

As described above, in the present embodiment, when the key 4 is placed on the cradle 8, the return home mode is set. In the return home mode, since the response operation of the key 4 is restricted, the damage caused by the relay attack can be effectively reduced.

Also, when the key 4 is removed from the cradle 8, the outing mode is set. In the outing mode, the key 4 permits the response to the radio wave A under a condition that the communication by the radio wave B is established between the key 4 and the vehicle-mounted device 3. The key 4 restricts the response to the radio wave A while the communication by the radio wave B is not established. As a result, the damage caused by the relay attack can be effectively reduced.

In addition, since it is sufficient to install the cradle 8 having a simpler configuration than that of the home device 6 of FIG. 4 at the home 5, the configuration and processing of the vehicle control system can be simplified.

In the present embodiment, it is determined whether the key 4 is placed on the cradle 8 based on the communication state between the BT communication devices 83 and 43. Alternatively, the key 4 may be equipped with a switch that is turned on when the key 4 is placed on the placing unit 81, and it may be determined whether the key 4 is placed on the cradle 8, or not, based on an on-off state of the switch of the key 4. According to this configuration, it can be determined whether the key 4 is placed on the cradle even when the cradle is not equipped with a communication device.

In the present embodiment, the control unit 40 that executes the processing of S52 to S55 in FIG. 10 corresponds to a response control unit. Further, the control unit 40 that executes the processing of S51 and S57 in FIG. 10 corresponds to a placement determination unit. Further, the control unit 40 that executes the processing of S56 and S58 corresponds to a mobile device mode setting unit.

(Fourth Embodiment)

Next, a fourth embodiment will be described focusing on portions different from the embodiments described above. In the above embodiment, the home device 6 or the cradle 8 is provided to the home 5. In the present embodiment, instead of the home device 6 or the cradle 8, an interference wave generation device 9 shown in FIG. 11 is provided to the home 5, and the interference wave generation device 9 corresponds to an invalidation device.

Figure 11:
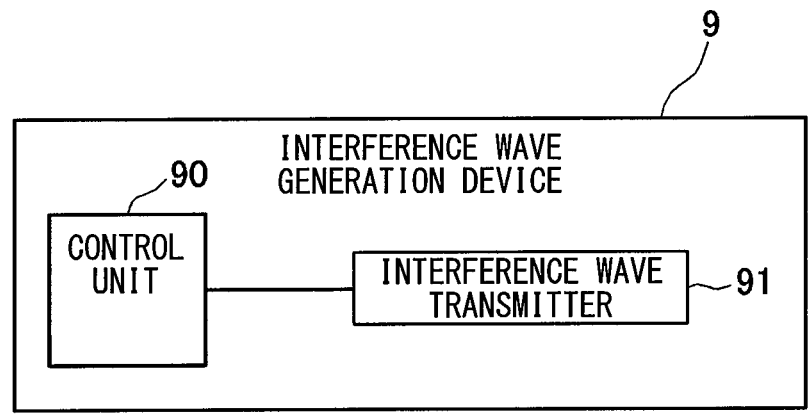
FIG. 11 is a configuration diagram of an interference wave generation device.

As illustrated in FIG. 11, the interference wave generation device 9 is provided with an interference wave transmitter 91 and a control unit 90 connected to the interference wave transmitter 91. The interference wave transmitter 91 transmits, to the home 5, an interference wave having the same frequency band as that of the radio waves transmitted or received by the vehicle-mounted device 3 or the key 4, that is, the radio wave (radio wave A) of the LF band, the radio wave of the RF band, or the radio wave (radio wave B) of Bluetooth (registered trademark). The control unit 90 includes a CPU, a ROM, a RAM, and the like, and controls the interference wave transmitter 91 to transmit interference waves.

The vehicle-mounted device 3 (the control ECU 30) executes processing shown in FIG. 5 except for the processing that is not related to the home device 6. Specifically, the processing of S1 to S6 in FIG. 5 is not executed, and the control ECU 30 executes the processing of S7 to S13.

The key 4 (the control unit 40) executes processing shown in FIG. 6 except for the processing that is not related to the home device 6. Specifically, the processing of S21 to S24, S27, and S28 in FIG. 6 is not executed, and the control unit 40 executes the processing of S25, S26, and S29 to S31.

As described above, also in the present embodiment, the vehicle-mounted device 3 transmits the radio wave A only when the communication of the radio wave B with the key 4 is established, and the key 4 responds to the radio wave A only when the communication of the radio wave B with the vehicle-mounted device 3 is established.

According to the present embodiment, since the interference waves having the same frequency band as that of the radio wave of the LF band, the radio wave of the RF band, or the radio wave of Bluetooth (registered trademark) are generated by the interference wave generation device 9 in the home 5. Therefore, the radio waves between the vehicle-mounted device 3 and the key 4 can be effectively prevented from being relayed to a third party when the user is at home 5 (when the vehicle 2 and the key 4 are at home 5). That is, the damage caused by the relay attack can be effectively reduced. In addition, since it is sufficient to install the interference wave generation device 9 having a simpler configuration than that of the home device 6 of FIG. 4 to the home 5, the configuration and processing of the vehicle control system can be simplified.

The interference wave generation device 9 may be provided with a function of detecting whether the user has returned to the home 5 or goes out of the home 5 similarly to the home device 6, and the control unit 90 may control the interference wave transmitter 91 to transmit the interference waves only when the user has returned to the home 5. According to the above configuration, when the user is out, the operation of the interference wave generation device 9 is stopped. Therefore, a communication of another communication device provided at the home 5 can be prevented from being interfered.

(Fifth Embodiment)

Figure 12:
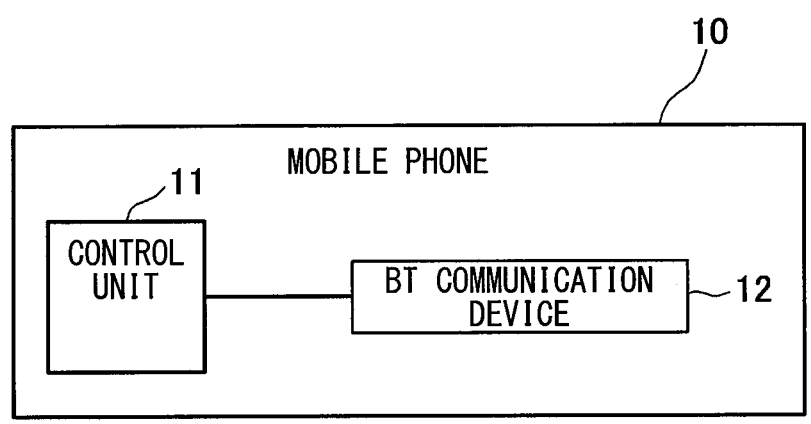
FIG. 12 is a configuration diagram of a mobile phone.

Next, a fifth embodiment will be described focusing on portions different from the above embodiments. The vehicle control system according to the present embodiment includes a mobile phone 10 shown in FIG. 12 in addition to the vehicle-mounted device 3 shown in FIG. 2 and the key 4 shown in FIG. 3. The mobile phone 10 corresponds to a portable object carried by the user. As an option, the home device 6 in FIG. 4 may also be provided. In the following description, it is assumed that the home device 6 is not provided.

The mobile phone 10 is a known communication device (for example, a smartphone) possessed by a user of the vehicle 2 and having a call function capable of making a telephone call by wireless communication. The mobile phone 10 includes a BT communication device 12 and a control unit 11 to which the BT communication device 12 is connected. The BT communication device 12 wirelessly communicates with surrounding wireless communication devices having a communication function of Bluetooth (registered trademark) according to the communication protocol of Bluetooth (registered trademark). When the user carries both of the mobile phone 10 and the key 4, a communication range of the BT communication device 12 enables a communication between the mobile phone 10 and the key 4, and the communication is disabled when the mobile phone 10 and the key 4 are placed at different positions in the home 5. Specifically, the communication range of the BT communication device 12 is set to, for example, about 1 meter to 3 meters. When the key 4 is located in the communication range of the BT communication device 12, the BT communication device 12 and the BT communication device 43 are paired with each other in advance so as to enable the communication between the BT communication device 12 and the key 4 (BT communication device 43). The BT communication device 12 corresponds to a first communication device.

The control unit 11 includes a CPU, a ROM, a RAM, and the like, and executes processing related to a call function and controls the BT communication device 12. Specifically, the control unit 11 controls the BT communication device 12 so as to establish the Bluetooth (registered trademark)

communication with the key 4 that is located in the communication range of the BT communication device 12.

In the above embodiments, the transmission of the radio wave A and the response to the radio wave A are permitted only when the communication of the radio wave B between the vehicle-mounted device 3 and the key 4 is established. In the present embodiment, the establishment of the communication of the radio wave B between the vehicle-mounted device 3 and the key 4 is omitted. Instead, the key 4 responds to the radio wave A when the communication of the radio wave B is established between the key 4 and the mobile phone 10, and the key 4 restricts the response to the radio wave A when the communication between the key 4 and the mobile phone 10 is not established.

Specifically, the vehicle-mounted device 3 (the control ECU 30) skips the processing of S1 to S8 in the processing of FIG. 5 and executes the processing of S9 to S13. In other words, the control ECU 30 does not transmit the radio wave B, but transmits the radio wave A periodically or at the time of occurrence of an event (when the lock switch 34, the unlock switch 35, or the engine start switch 37 is operated).

Figure 13:
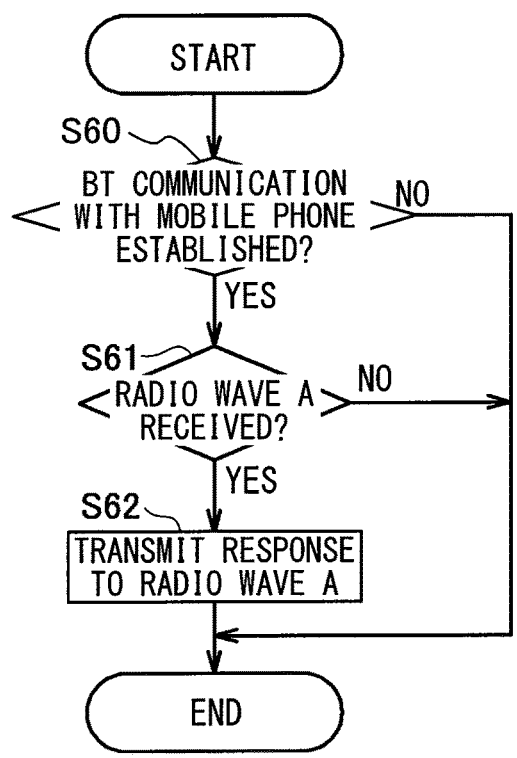
FIG. 13 is a flowchart of processing executed by a control unit of a key according to a fifth embodiment.
Figure 14:
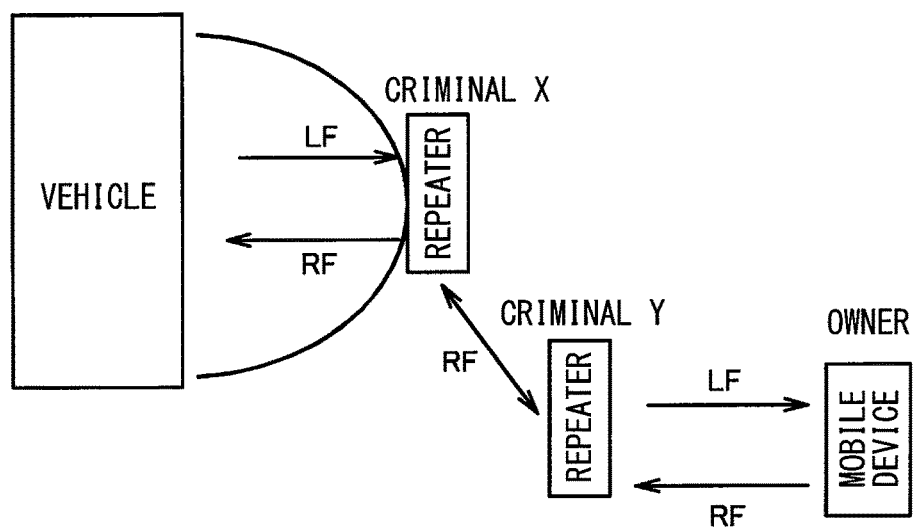
FIG. 14 is a diagram illustrating an outline of relay attack.

The key 4 (control unit 40) executes the processing of FIG. 13 instead of the processing of FIG. 6. The processing of FIG. 13 is repeatedly executed in a predetermined cycle. When starting the processing in FIG. 13, the control unit 40 determines whether the communication of the radio wave B (communication of Bluetooth (registered trademark)) with the mobile phone 10 has been established, or not (S60). In other words, the control unit 40 determines whether the radio wave B from the BT communication device 12 of the mobile phone 10 can be received, or not. That is, the control unit 40 determines whether the key 4 is located in the communication range of the BT communication device 12 of the mobile phone 10, or not. When the communication of the radio wave B with the mobile phone 10 is not established (NO in S60), the processing of FIG. 13 is completed.

When the communication of the radio wave B with the mobile phone 10 is established (YES in S60), it is then determined whether the radio wave A from the vehicle-mounted device 3 has been received, or not (S61). When there is no reception of the radio wave A (NO in S61), the processing of FIG. 13 is terminated. When there is a reception of the radio wave A (YES in S61), the control unit 40 generates a response signal including an ID for authenticating the key 4, and controls the RF transmission unit 42 to transmit the RF radio wave of the response signal (S62). Thereafter, the process of FIG. 13 is completed.

In this manner, the key 4 responds to the radio wave A only when the communication with the mobile phone 10 is established. As a result, for example, when the user returns to the home 5, and the key 4 and the mobile phone 10 are placed at different positions, the operation of the key 4 is restricted so that the damage caused by the relay attack can be effectively reduced. On the other hand, in a scene where the user goes out, since it is assumed that the user carries both of the key 4 and the mobile phone 10, the communication between the key 4 and the mobile phone 10 is established, and the key 4 responds to the radio wave A.

Further, in the present embodiment, since there is no need to perform the communication of radio waves B between the vehicle-mounted device 3 and the key 4, the BT communication device 33 of the vehicle-mounted device 3 can be omitted and the configuration and processing of the vehicle-mounted device 3 can be simplified.

In the present embodiment, the control unit 40 that executes the processing in FIG. 13 corresponds to a response control unit.

(Other Embodiments)

In the embodiments described above, the communication range 102 (refer to FIG. 1) of the BT communication device 33 is set to be wider than the communication area 101 of the radio wave A. Alternatively, the communication range 102 may be set to be equal to the communication area 101 or smaller than the communication area 101. This also makes it possible to effectively reduce a damage caused by a relay attack.

In the embodiments described above, the communication protocol of Bluetooth (registered trademark) has been described as an example of the communication protocol different from the communication protocol of the radio wave A. Alternatively, other communication protocol except the Bluetooth (registered trademark) may be employed. In other words, the vehicle-mounted device 3 and the key 4 each may include a communication device for transmitting and receiving communication signals under a protocol different from the Bluetooth (registered trademark) and also different from that of the LF radio wave or the RF radio wave (including a case in which only a frequency band is different) in addition to the transceivers of the LF radio wave and the RF radio wave. In this case, the vehicle-mounted device 3 and the key 4 transmit the radio wave A and respond to the radio wave A only when the different communication by the corresponding communication device is established. Likewise, the communications between the key 4 and the home device 6, between the vehicle-mounted device 3 and the home device 6, between the key 4 and the cradle 8, and between the key 4 and the mobile phone 10 may employ a communication protocol other than the Bluetooth (registered trademark).

In addition, in S29 of FIG. 6, the key 4 responds to the radio wave B transmitted from the vehicle-mounted device 3 with the use of the radio wave B. Alternatively, the key 4 may respond to the radio wave B with the RF radio wave by the RF transmission unit 42.

In the first embodiment, the home device 6 is provided in the vehicle control system. Alternatively, the home device 6 may be omitted in another embodiment. In this case, the vehicle-mounted device 3 executes S7 to S13 in FIG. 5, and the key 4 executes S25, S26, S29 to S31 in FIG. 6. As a result, the configuration and processing of the vehicle control system can be simplified.

In the first embodiment, the key 4 and the vehicle-mounted device 3 are switched to the return home mode or the outing mode based on the mode switching request signal transmitted from the home device 6. Alternatively, a communication by the radio wave B with the home device 6 may be tried, and when the radio wave B can be received from the home device 6 (the communication is established), the mode may be switched to the return home mode. When the radio wave B cannot be received (the communication is not established), the mode may be switched to the outing mode.

In addition, the vehicle-mounted device 3 may determine whether the mobile device is located at the home 5 or located elsewhere by a method other than the radio wave B transmitted from the home device 6. When the mobile device is located at the home 5, the mode may be set to the return home mode. When the mobile device is located at a place other than the home 5, the mode may be set to the outing mode. For example, the vehicle-mounted device 3 may be provided with a current position detection unit (such as a receiver that receives a GPS signal (current position signal)) for detecting the current position of the vehicle 2. By determining the present position detected by the current position detection unit is at the home 5 or not, it is capable of determining whether the vehicle-mounted device 3 is located at the home 5 or elsewhere.

In the first embodiment, the home 5 has been described as an example of the location where the operation of the key 4 and the vehicle-mounted device 3 is restricted. As long as the user can stay for a certain period of time at a place, the operation of the key 4 and the vehicle-mounted device 3 may be restricted at the place (for example, a company) other than the home 5.

In the first embodiment, when the communication of the radio wave B is not established between the vehicle-mounted device 3 and the key 4, both of the transmission of the radio wave A by the vehicle-mounted device 3 and the response to the radio wave A by the key 4 are restricted. Alternatively, only the transmission of the radio wave A or only the response to the radio wave A may be restricted. This also makes it possible to effectively reduce the damage caused by the relay attack.

In the fifth embodiment, the mobile phone 10 has been described as an example of the portable object, which is carried by the user and can communicate with the key 4. Alternatively, a communication module that can communicate with the key 4 may be attached to the portable object (for example, user's glasses) other than the mobile phone 10. The key 4 may respond to the radio wave A only when the communication with the portable object is established.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A vehicle control system comprising:
a vehicle-mounted device mounted on a vehicle; and
a mobile device that is portable by a user,
wherein
the vehicle-mounted device permits a predetermined operation on the vehicle based on a response signal which is transmitted from the mobile device in response to a request signal transmitted from the vehicle-mounted device,
the vehicle-mounted device includes a first communication device that performs a wireless communication with the mobile device at a frequency band different from a frequency band of the request signal and a frequency band of the response signal, and
the mobile device includes:
a second communication device that performs the wireless communication with the first communication device; and
a response control unit that responds to the request signal under a condition that the mobile device is located in a communication range of the first communication device and the wireless communication between the first communication device and the second communication device is established, wherein the response control unit does not respond to the request signal when the mobile device is located outside of the communication range of the first communication device and the wireless communication between the first communication device and the second communication device is not established, wherein the communication range of the first communication device included in the vehicle-mounted device is wider than or smaller than a transmission range of the request signal transmitted from the vehicle-mounted device.

2. A vehicle control system comprising:
a vehicle-mounted device mounted on a vehicle; and
a mobile device that is portable by a user,
wherein
the vehicle-mounted device permits a predetermined operation on the vehicle based on a response signal which is transmitted from the mobile device in response to a request signal transmitted from the vehicle-mounted device,
the vehicle-mounted device includes a first communication device that performs a wireless communication with the mobile device at a frequency band different from a frequency band of the request signal and a frequency band of the response signal,
the mobile device includes a second communication device that performs the wireless communication with the first communication device,
the vehicle-mounted device includes a transmission control unit that transmits the request signal under a condition that the mobile device is located in a communication range of the first communication device and the wireless communication between the first communication device and the second communication device is established, and
the transmission control unit does not transmit the request signal when the mobile device is located outside of the communication range of the first communication device and the wireless communication between the first communication device and the second communication device is not established,
wherein the communication range of the first communication device included in the vehicle-mounted device is wider than or smaller than a transmission range of the request signal transmitted from the vehicle-mounted device.

3. A vehicle control system comprising:
a vehicle-mounted device mounted on a vehicle; and
a mobile device that is portable by a user,
wherein
the vehicle-mounted device permits a predetermined operation on the vehicle based on a response signal which is transmitted from the mobile device in response to a request signal transmitted from the vehicle-mounted device,
the vehicle-mounted device includes a first communication device that performs a wireless communication with the mobile device at a frequency band different from a frequency band of the request signal and a frequency band of the response signal,
the mobile device includes a second communication device that performs the wireless communication with the first communication device,
the vehicle-mounted device includes an operation control unit that permits the predetermined operation based on the response signal under a condition that the mobile device is located in a communication range of the first communication device and the wireless communication between the first communication device and the second communication device is established, and
the operation control unit does not permit the predetermined operation when the mobile device is located outside of the communication range of the first communication device and the wireless communication between the first communication device and the second communication device is not established even though the response signal is received, wherein the communication range of the first communication device included in the vehicle-mounted device is wider than or smaller than a transmission range of the request signal transmitted from the vehicle-mounted device.

4. The vehicle control system according to claim 1, wherein the communication range of the first communication device included in the vehicle-mounted device is wider than a transmission range of the request signal.

5. The vehicle control system according to claim 1, further comprising an invalidation device disposed at a predetermined location and controls the mobile device to invalidate a transmission of the response signal in response to the request signal when the mobile device is disposed at the predetermined location.

6. The vehicle control system according to claim 5, wherein the invalidation device includes:
a third communication device that transmits a radio signal toward the predetermined location; and
a communication control unit that controls the third communication device to transmit an operation restriction signal as the radio signal, and the mobile device includes:
a mobile device receiving unit that receives the radio signal from the third communication device; and
a mobile device mode setting unit that sets a response restriction mode in which the transmission of the response signal in response to the request signal is restricted when the mobile device receiving unit receives the operation restriction signal.

7. The vehicle control system according to claim 6, wherein the invalidation device includes an outing detection unit that detects an absence of the user at the predetermined location, the communication control unit controls the third communication device to transmit a restriction cancel signal as the radio signal when the outing detection unit detects the absence of the user, and the mobile device mode setting unit cancels the response restriction mode when the mobile device receiving unit receives the restriction cancel signal.

8. The vehicle control system according to claim 5, wherein the invalidation device includes a placing unit on which the mobile device is placeable, the mobile device includes a placement determination unit that determines whether the mobile device is placed on the placing unit, the mobile device includes a mobile device mode setting unit that sets a response restriction mode in which the transmission of the response signal in response to the request signal when the mobile device is placed on the placing unit, and the mobile device mode setting unit cancels the response restriction mode when the mobile device is removed from the placing unit.

9. The vehicle control system according to claim 8, wherein the invalidation device includes a third communication device that communicates with the mobile device placed on the placing unit, the mobile device includes a fourth communication device that communicates with the third communication device of the invalidation device, and the placement determination unit of the mobile device determines that the mobile device is placed on the placing unit when a communication between the third communication device of the invalidation device and the fourth communication device of the mobile device is successfully established.

10. The vehicle control system according to claim 5, wherein the invalidation device includes a device that generates an interference wave and interferes the wireless communication performed at the predetermined location using the interference wave.

11. The vehicle control system according to claim 1, wherein the vehicle-mounted device further includes:
a detection unit that detects whether the vehicle is disposed at a predetermined location; and
a vehicle mode setting unit that restricts a transmission of the request signal when the vehicle is disposed at the location and sets a vehicle restriction mode in which the predetermined operation on the vehicle is not permitted even though the response signal is received.

12. The vehicle control system according to claim 11, further comprising a third communication device disposed at the predetermined location and transmits a radio signal toward the predetermined location; and a communication control unit that controls the third communication device to transmit an operation restriction signal as the radio signal, wherein the detection unit includes a vehicle receiving unit that receives the radio signal transmitted from the third communication device, and the vehicle mode setting unit sets the vehicle restriction mode when the vehicle receiving unit receives the operation restriction signal.

13. The vehicle control system according to claim 12, further comprising an outing detection unit disposed at the predetermined location, the outing detection unit detecting an absence of the user at the predetermined location, wherein the communication control unit controls the third communication device to transmit a restriction cancel signal as the radio signal when the outing detection unit detects the absence of the user, and the vehicle mode setting unit cancels the vehicle restriction mode when the vehicle receiving unit receives the restriction cancel signal.

14. The vehicle control system according to claim 6, wherein a frequency band of the third communication device is identical to the frequency band of the first communication device and the second communication device.

15. A vehicle control system comprising:
a vehicle-mounted device mounted on a vehicle; and
a mobile device that is portable by a user,
wherein
the vehicle-mounted device permits a predetermined operation on the vehicle based on a response signal which is transmitted from the mobile device in response to a request signal transmitted from the vehicle-mounted device, a portable object of the user includes a first communication device that performs a wireless communication with the mobile device at a frequency band different from a frequency band of the request signal and a frequency band of the response signal, and the mobile device includes:
- a second communication device that performs the wireless communication with the first communication device; and
- a response control unit that responds to the request signal under a condition that the mobile device is located in a communication range of the first communication device and the wireless communication between the first communication device and the second communication device is established, wherein the response control unit does not respond to the request signal when the mobile device is located outside of the communication range of the first communication device and the wireless communication between the first communication device and the second communication device is not established.

16. The vehicle control system according to claim 15, wherein:
the mobile device is a key; and
the portable object is a mobile phone.

* * * * *